United States Patent
Bundy et al.

(10) Patent No.: US 7,823,128 B2
(45) Date of Patent: *Oct. 26, 2010

(54) APPARATUS, SYSTEM AND/OR METHOD FOR COMBINING MULTIPLE TESTS TO A SINGLE TEST IN A MULTIPLE INDEPENDENT PORT TEST ENVIRONMENT

(75) Inventors: Laura Marie Bundy, Fort Collins, CO (US); Julia Ann Keahey, Loveland, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 1474 days.

This patent is subject to a terminal disclaimer.

(21) Appl. No.: 10/828,628

(22) Filed: Apr. 19, 2004

(65) Prior Publication Data

US 2005/0235263 A1    Oct. 20, 2005

(51) Int. Cl.
*G06F 9/45* (2006.01)
(52) U.S. Cl. .................................................. 717/124
(58) Field of Classification Search .......... 717/124–131
See application file for complete search history.

(56) References Cited

U.S. PATENT DOCUMENTS

| | | | | |
|---|---|---|---|---|
| 5,651,111 | A * | 7/1997 | McKeeman et al. | 714/38 |
| 5,864,660 | A * | 1/1999 | Hamameh et al. | 714/32 |
| 6,701,474 | B2 * | 3/2004 | Cooke et al. | 714/724 |
| 7,039,545 | B2 * | 5/2006 | Bundy et al. | 702/119 |
| 7,174,491 | B2 * | 2/2007 | Hamilton et al. | 714/724 |
| 7,290,174 | B1 * | 10/2007 | Gray et al. | 714/33 |
| 7,363,618 | B2 * | 4/2008 | Pal et al. | 717/131 |
| 2002/0091979 | A1 * | 7/2002 | Cooke et al. | 714/733 |
| 2002/0099992 | A1 * | 7/2002 | Distler et al. | 714/738 |
| 2004/0015870 | A1 * | 1/2004 | Arbouzov et al. | 717/126 |

OTHER PUBLICATIONS

Agilent Technologies, www.agilent.com/see/concurrentest, "Agilent Concurrent Test" Nov. 1, 2001, 2 pages.
Agilent Technologies, www.agilent.com/cgi-bin/bvpub/agilent/editorial, "Concurrest Test Backgrounder", Aug. 13, 2003, 3 pages.
Go/semiconductor, "Concurrent Test allows parallel testing of IPblocks within each device", Autumn 2001, p. 16, 1 page.

(Continued)

*Primary Examiner*—John Chavis
(74) *Attorney, Agent, or Firm*—Holland & Hart, LLP

(57) ABSTRACT

Test development tools, systems and/or methods which include accessing first and second pre-established test programs, each of said first and second pre-established test programs having been previously established for respective first and second pre-existing integrated circuit devices, and said first and second pre-established test programs each having respective first and second sets of subtest code portions; evaluating the first and second sets of subtest code portions and determining whether any respective subtest code portions of said first and second sets of subtest code portions have features allowing for combination in a new test program, said evaluating and determining steps providing at least one output result thereof; and defining a new test program including new subtest code portions for concurrently testing first and second pre-existing integrated circuit devices using the at least one output result of the evaluating and determining steps.

24 Claims, 9 Drawing Sheets

OTHER PUBLICATIONS

Mark LaPedus, Silicon Strategies, www.siliconstrategies.com, "Agilent claims breakthrough in test reuse for SoCs", May 30, 2003, 2 pages.

Jeff Chappell, Electronic News, www.reed-electronics.com, "Agilent Unveils Core Test Language Browser", May 30, 2003, 2 pages.

* cited by examiner

APPARATUS, SYSTEM AND/OR METHOD FOR COMBINING MULTIPLE TESTS TO A SINGLE TEST IN A MULTIPLE INDEPENDENT PORT TEST ENVIRONMENT

BACKGROUND

An important aspect in many manufacturing processes is the testing of the resulting products. Testing is used to verify that the manufactured products function and operate properly and perform in accordance with the specifications set forth by the product design. There are often pluralities of tests which may be performed on the product or products at different points or stages in the manufacturing process. For example, after a particular sub-assembly of a product is manufactured, there may be tests performed to verify the specific functions of the sub-assembly prior to its incorporation into an overall final product. In addition to or oftentimes as a preferred alternative to separate testing of the sub-assemblies or sub-components, there may be tests performed on the final overall completed product including testing of the one or more sub-components thereof after the final step of the manufacturing/assembling process.

In order to meet an ever-increasing demand of consumers for the latest high technology products, manufacturers are forced to constantly design and deliver these new products to the marketplace in an ever decreasing time span. Techniques that shorten the time needed to bring a product to market can provide a competitive advantage over competitors who do not have access to such techniques. Consequently, any such techniques or mechanisms to shorten the time-to-market are desirable and may be readily accepted by manufacturers. Shortening the total time required to adequately test the functionality of the manufactured products is one way to decrease the time required and can thus be one if not the most time critical element in bringing a new product to market. As such, the overall test time may typically be a function of one or more factors, e.g.: (1) the run time of the test, i.e., the time it takes to actually perform a particular test on the device, and (2) the test development or set-up time, i.e., the time it takes to configure, verify and set-up the test equipment to perform the test. Thus, in order to decrease the total test time, it is desirable to find ways to shorten either or both of the run time and/or the set-up times of the tests.

Heretofore, integrated circuit (IC) and/or system on a chip (SOC) and/or multi-chip module (MCM) devices have been tested and verified using a variety of testing methods. In some examples, IC and/or SOC devices have been tested and verified to be defect free using functional test vectors, i.e., electrical stimuli, such as those applied to the IC and/or SOC by the use of automated test equipment (ATE), which stimulate and verify the IC/SOC device functionality at the pin-level of the device. A practical advantage to the utilization of such equipment, ATE, for testing ICs and/or SOCS, is in some embodiments, the use of multiple independent ports of a single ATE which will allow independent control of multiple independent ports for parallel or concurrent testing of discrete portions of the ICs or often more especially the SOCs or like devices. In such cases, discrete pins (or pads) are discretely assigned to particularly defined ports of the ATE. Then the ATE can perform discrete test patterns concurrently via the separate ports.

Among other advantages, concurrent testing of this sort has enabled parallel testing of multiple intellectual property (IP) blocks within each device. Likewise, such a test system allows for concurrent testing of any number of on-chip functions. For example, such a system can test multiple logic, embedded memory and/or analog or digital IP blocks in parallel rather than sequentially. The only fundamental requirement, addressed in the design and test set-up phases, is that the discrete IP blocks and/or other logic on the IC or SOC (system-on-a-chip) device be isolated as designed so they are independently accessible, observable, and controllable and may thus be assigned to separate, discrete ports during the test set-up phase. Testing of this sort of SOC is allowed by the per-port architecture of the ATE which supports independent testing of the assigned blocks including such independent test parameters as period, timing, levels, pattern and sequencing.

Note, SOCs and likewise MCMs may be considered special kinds of ICs wherein SOCs and MCMs are devices which may contain an assortment of one or more circuit features such as intellectual property (IP) blocks in SOCs and/or multiple chips in MCMs. These may then include, for example, logic cores, memories, embedded processors, and/or a range of mixed-signal and RF cores to support voice, video, audio and/or data communications. Thus, SOCs and MCMs may represent a sort of IC integration, where stand-alone IC chipsets are merged into a few or even into a single SOC or MCM. To save on development costs, several SOC or MCM vendors today are creating converged ICs that include a wide range of computational, communication, and/or entertainment functionality. Such devices may require many or all of these capabilities because their jobs may include obtaining data and/or executable code from or through various communication methods and/or protocols, decoding that data and/or code and then displaying, distributing and/or storing that data and/or executing the code to operate in accordance therewith.

However, given that these converged SOCs and/or MCMs may be highly elastic in the capabilities they will provide, the exact test requirements for each SOC or MCM is a function of the IP blocks or individual pre-existing chips integrated therein. Also, these converged SOCs and MCMs will typically require a full gamut of testing capabilities; from RF and mixed signal to high-speed digital, memory, and scan test. To test the various IP blocks using traditional ATE equipment has often involved the use of sequential testing. Parallel or concurrent test strategies, on the other hand, were made available by the use of a plurality of otherwise separate ports or channels in the ATE. A port is a connection on or from the ATE to a collection of one or more pins in/on the IC/SOC. Independent tests may then be performed concurrently or in parallel using separate ports so long as the pins are properly and separately assigned to separate ports. For example, a certain first set of pins on an SOC may be dedicated to a particular IP core on the SOC, and a second set of pins may similarly be separately dedicated to a second particular IP core on the same SOC; then, each of these sets of pins may then be assigned to separate ports on the ATE, and thus provide for separate and parallel, i.e., non-sequential testing of those two IP cores. This can then reduce test time; e.g., the same number of tests can be run at a reduced time so long as some of the tests are run concurrently. Reduced test time assumes however, that the pins are properly assigned to the appropriate ATE ports during test set-up.

As utilized herein, the term device is intended hereafter to include and refer to a chip or an IC and/or an SOC and/or an MCM as well, and thus these are also intended to be used interchangeably, with the exception of those specific references to the term SOC where it may be discretely distinct from any ordinary chip or IC. Moreover, the term device is also intended to refer to and encompass a multi-chip module (MCM) (also known as an MCU, or multi-chip unit) which is a device having two or more chips or ICs (or SOCS, or any combination thereof) disposed on a single or common substrate.

SUMMARY

Herein disclosed are test development tools, systems and/or methods which may include various parts such as a first element for accessing first and second pre-established test programs in a multi-port concurrent test environment, each of said first and second pre-established test programs having been previously established for respective first and second pre-existing integrated circuit devices, and said first and second pre-established test programs each having respective first and second sets of subtest code portions; a second element for evaluating the first and second sets of subtest code portions and determining whether any respective subtest code portions of said first and second sets of subtest code portions have features allowing for combination in a new test program, said evaluating and determining steps providing at least one output result thereof; and third element for defining a new test program including new subtest code portions for concurrently testing first and second pre-existing integrated circuit devices using the at least one output result of the evaluating and determining steps.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

Figure 1:
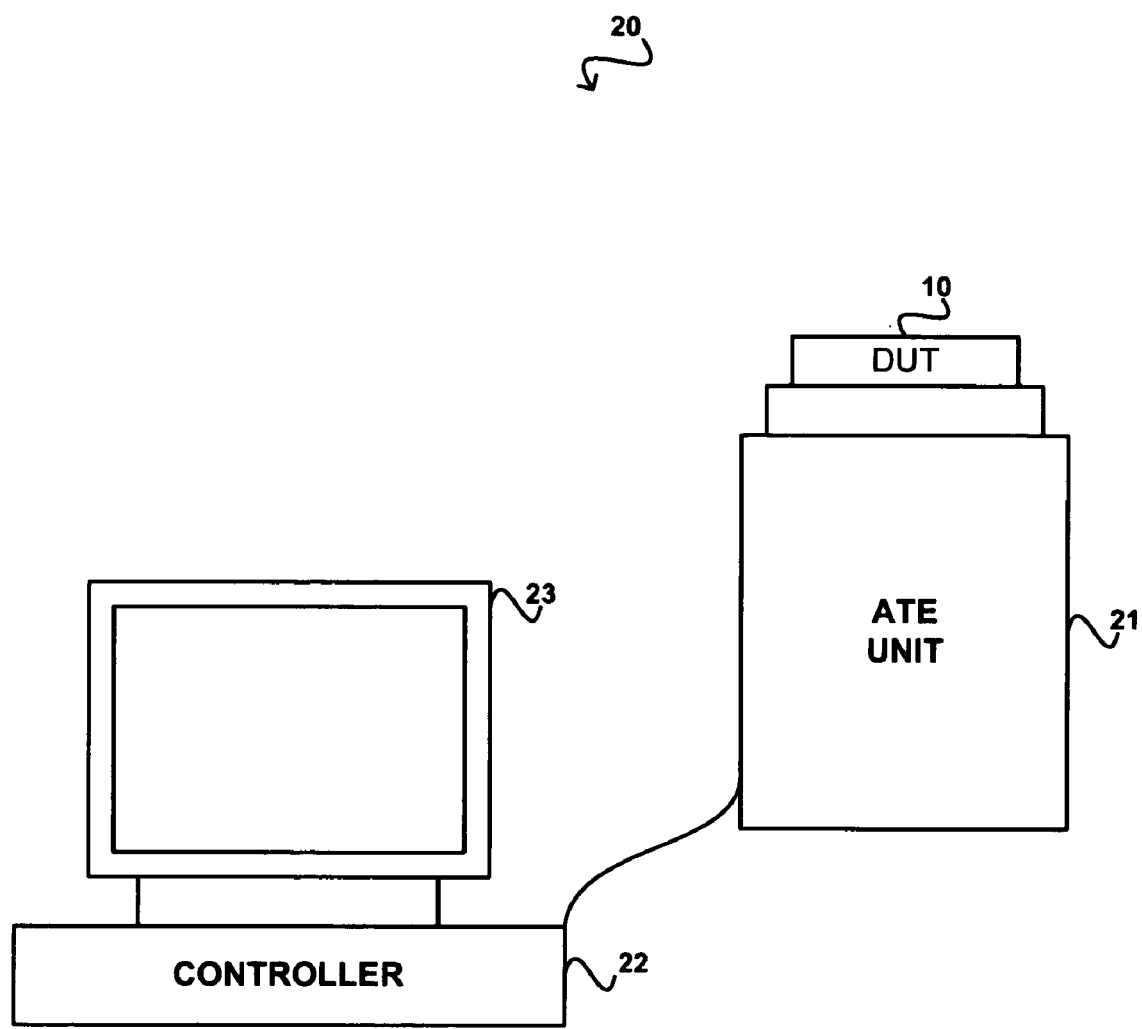
FIG. 1 is a schematic diagram depicting automated test equipment and a device to be tested therewith.

Reference will now be made in detail to the description of the invention as illustrated in the drawings with like numerals indicating like parts throughout the several views. The description to follow describes how either or both of the time elements of setting up a test and/or running a test may be shortened for a new combinational device by combining two existing, executing tests into a single test for parallel execution. The use of existing tests may create a test development time improvement. The testing of the two device elements in parallel may save in test execution time.

Exemplary embodiments of the present invention may be useful with various devices including integrated circuits, ICs, generally, or more particularly with systems-on-chips, SOCs and/or multi-chip modules, MCMs. A device 10 may represent either, as shown in FIG. 1, an integrated circuit, IC generally, or an SOC, or an MCM (and in some instances device 10 may represent a core 11, see description further below). Reference to any of these herein includes the others. Device 10 may also be referred to or known as a device under test, or DUT, or may be referred to using similar nomenclature. As further shown schematically in FIG. 1, DUT 10 may be connected in an overall test system 20 to automated test equipment 21. ATE 21 may have attached thereto or incorporated therein a test controller 22. Test controller 22 may further include input and/or output devices such as the display screen 23 shown and/or a keyboard, mouse, stylus, scanner, disk drive or other computer connection (a serial port, a local access network connection, cable, ethernet, WiFi, or the like) (none of which being shown separately).

Figure 2:
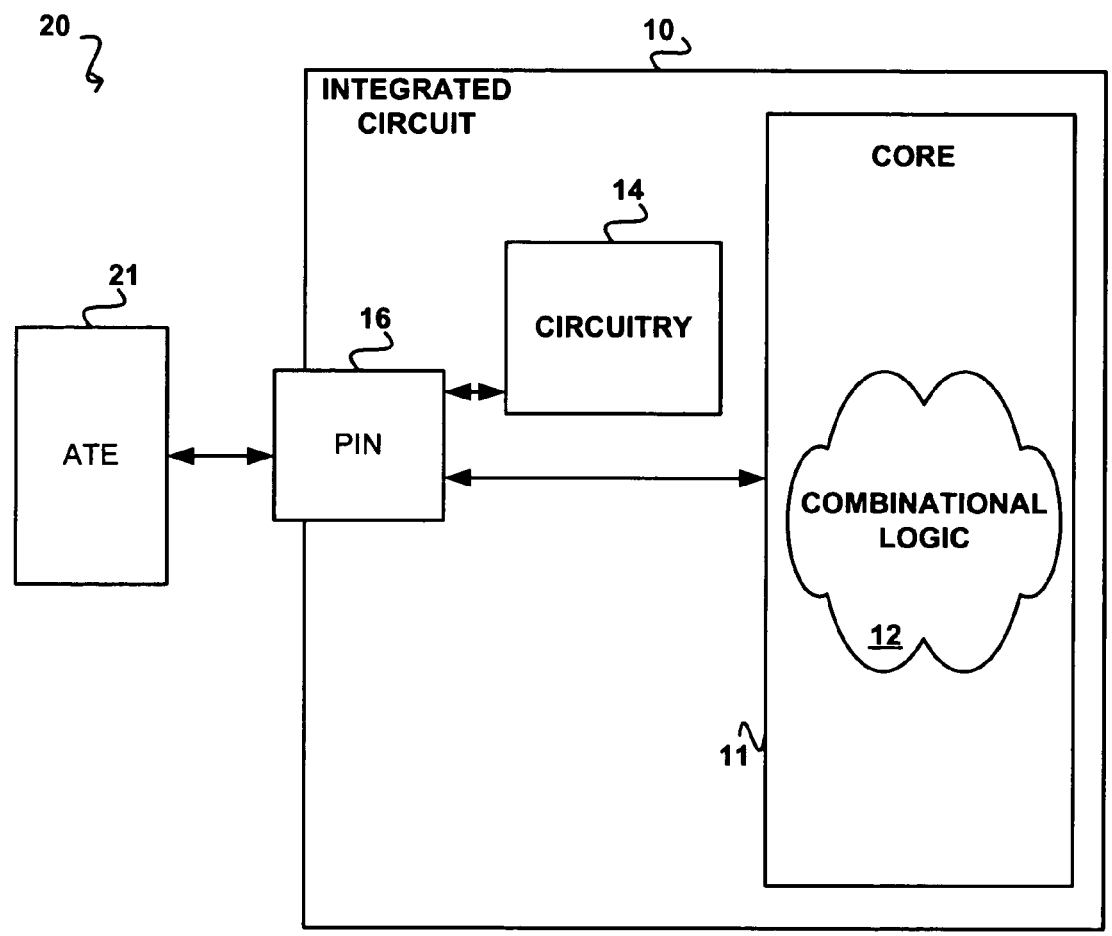
FIG. 2 is another schematic diagram depicting automated test equipment and a device to be tested therewith.

Referring now to FIG. 2, DUT 10 may then also include one or more cores 11 (only one shown in FIG. 2) such as is the case with conventional SOCs. Such a DUT 10 and/or the core(s) 11 may also incorporate combinational logic 12. DUT 10 and/or core(s) 11 may either or both also include other integrated circuitry 14. Core 11 electrically communicates with at least one pin or pad 16 of the DUT 10 which is configured to electrically communicate with devices external to the DUT 10, such as automated test equipment (ATE) 21, for example. So configured, an external device, e.g., ATE 21, may deliver signals to or receive response signals from the core 11, logic 12 and/or circuitry 14 via a transmission path which may include a pin or pad 16. When such communication is thus established, an overall test system 20 is created.

The ATE 21 may be configured to provide functional-based testing of circuitry contained on DUT 10 (e.g., circuitry 14), and/or more particularly, may provide testing for the combinational logic 12 within the one or more cores 11. In order to accomplish such testing, the ATE 21 typically incorporates a stimulus generator and a response analyzer. More specifically, the stimulus generator in the ATE 21 may be configured to provide one or more test patterns for testing logic circuitry of the core 11. The pattern or patterns provided to the logic circuitry may include digital data or signals, i.e., zeros and ones. In response to the various patterns, the logic circuitry under test then provides a response signal or signals to the response analyzer of the ATE 21 which is able to interpret the response and provide a test result signal which may otherwise be communicated or used by the ATE or the operator of the ATE in accepting or rejecting the device 10. Thus, the ATE provides for digital and/or analog, functional testing of one or more parameters of the core or other circuitry of the DUT 10 by applying digital test patterns to the logic circuitry of the core. Such automated testing has, heretofore, been substantially provided for by such external test equipment, i.e., ATE 21, by the generation and provision of digital patterns to the integrated circuit and/or SOC for facilitating testing of the logic circuitry thereof. An ATE test protocol often embodied in a test program which is adapted to provide the test signals and measure the responses corresponding to the at least one parameter of the device is also provided. More details of exemplary test protocols and/or programs including methods for device testing will be described hereinbelow.

Figure 3:
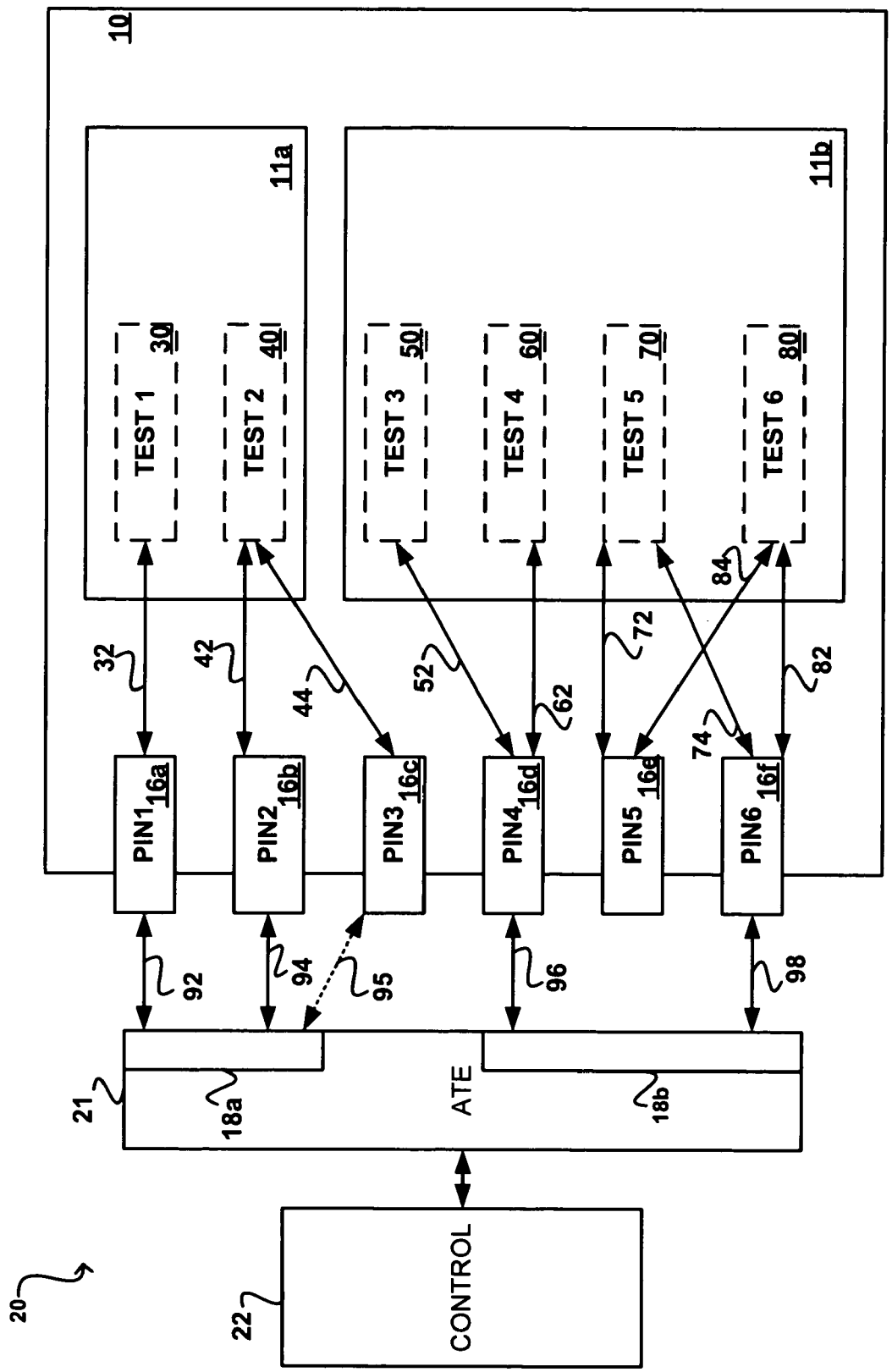
FIG. 3 is yet another schematic diagram depicting automated test equipment and a device to be tested therewith.
Figure 4:
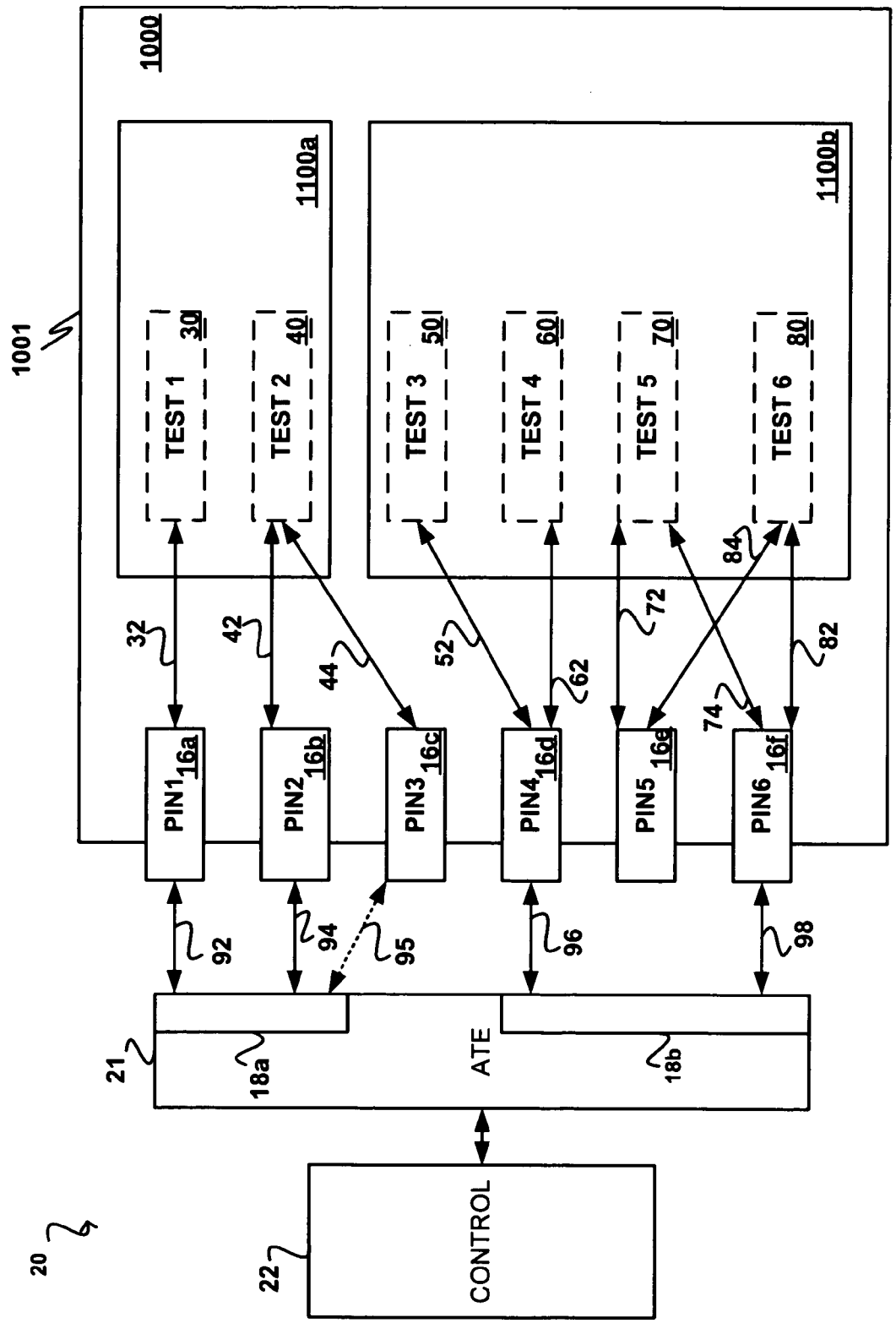
FIG. 4 is yet one further schematic diagram depicting automated test equipment and a device to be tested therewith.

First however, general characteristics of an exemplary embodiment of the analog and/or digital parameter test system 20 of the present invention will now be described in reference to the schematic representations in FIGS. 2, 3 and 4. As introduced above, system 20 incorporates an ATE 21 with a control 22 and a DUT 10 which may include one or more cores 11. As shown in FIG. 3, a DUT 10 may include a plurality of cores 11 e.g., cores 11a and 11b. The core or cores 11 (and more particularly the combinational logics thereof) electrically communicate with one or more pins or pads 16, e.g., the six pins 16a-16f shown in FIG. 3, which pins are then configured to allow intercommunication of the combinational logic of the cores 11 with external devices, such as ATE 21, for example. Alternatively, the DUT 10 may, as shown and described herein, be an MCM/DUT 1000 as shown in FIG. 4 which is shown having a plurality of chips, here two chips 110a and 1100b which may be commonly disposed on a substrate 1001. Chips 1100a and 110b may be ICs or SOCs or otherwise. Here, the chips 1100a and 110b may have and/or electrically communicate through and/or with one or more pins or pads 16, such as the exemplary six pins 16a-16f like those shown in FIG. 3, which pins are then configured to allow intercommunication of the combinational logic of the cores 11 and/or chips 1100a and 100b with external devices, such as ATE 21, for example.

As described in detail hereinafter, ATE 21 may preferably be configured to provide selected/selectable ATE functionalities on one platform and, thereby, reduce the necessity for separate specialized automated test equipment for testing integrated circuits of various configurations. Such selectability of functionalities may, inter alia, be a result of the alternatively re-definable multi-port structure/system represented schematically by the ports 18, e.g., ports 18a and 18b in/on ATE 21 in FIGS. 3 and 4. Such ports 18a and/or 18b may be defined to be communicative with one or more pins 16 of DUT 10/1000. For example, port 18a is shown defined to communicate with pin 1 16a and pin 2 16b shown schematically via respective schematic communication lines 92 and 94. As described further below, pin 3 16c may or may not also be defined to be communicative with port 18a as shown by the dashed line 95. Similarly, port 18b may be defined to be communicative with pins 4 and 6 16d and 16f (and alternatively also pin 5 16e, though not shown) via respective schematic communication lines 96 and 98 (note, as understood, not all pins, e.g. pin 5 16e, need be assigned to or otherwise communicate with a port or with the ATE). Defined this way, port 18a is defined to be communicative only with the pins of core 11a and not with any of the pins of core 11b while port 1b is conversely defined to communicate only with the pins of core 11b and not with any of core 11a. As will be described, this pin/port definition structure/method provides for the desirable parallel or concurrent testing of the two cores 11a and 11b.

For example, as further shown in FIGS. 3 and 4, six exemplar tests are shown schematically (dashed lines) relative to cores 11a and 11b and/or chips 1100a and 1100b (note these tests are not generally intended to, though they could, represent structures, and are thus shown in dashed lines). These six tests are labeled as Test 1 30, Test 2 40, Test 3 50, Test 4 60, Test 5 70 and Test 6 80. The various tests may then involve electrical signals which are then electrically communicable/communicated to/from ATE 21 via respective pins 16 in a variety of path configurations. For instance, test 1 30 may involve the communication of signals (to/from port 18a and ATE 21) through pin 16a via schematic transmission path 32 in/on DUT 10/1000; and test 2 40 may involve the communication of signals in/on DUT 10/1000 via each of pins 16b and 16c utilizing schematic transmission paths 42 and 44 respectively. Similarly, tests 3 50 and 4 60 may each be represented by the electrically communicated signals passing to/from pin 16d via transmission paths 52 and 62 respectively; while test 5 70 may involve communication with pins 16e and 16f via transmission paths 72 and 74 respectively; and test 6 80 may also involve electrical communications with pins 16e and 16f, albeit, via separate transmission paths 82 and 84 respectively. Thus, a DUT 10 and/or 1000 may incorporate various configurations of electrical signal intercommunications between the various pins and various cores, as well as various pin types and various test types.

Then as illustrative examples, and not for the purpose of limitation; it may be seen that a DUT 10 and/or 1000 (and/or the circuitry, and/or cores and/or chips thereof) may be tested by electrical signal communication with an ATE 21 via one pin (e.g., test1 30 via pin1 16a signals to and from the core 11a or chip 1100a) and/or via multiple pins (e.g., test2 40 utilizing multiple pins, e.g., pin2 16b and pin3 16c, whereby signals may be sent to and/or received from core 11a (or chip 1100a) via one or the other or both; note, pin3 may or may not be connected to the ATE in this situation, depending upon the type of test test2 might be). Similarly, the various pins could be used in more than one test each (e.g., test3 50 and test4 60 both using the same pin4 16d and likewise, test5 70 and test6 80 both making use of pin5 16e and pin6 16f). Note, it is likely that if one or more pins are used for more than one test, then the tests may likely not be run concurrently, but rather separated in time, sequentially or otherwise. Note also, though not shown, it is also possible that the pins could be used for more than one test and more than one core, but if so, then those tests would also likely have to be run at separate times, sequentially or otherwise, and thus, the cores with such overlapping pin definitions would likely have to be tested separately (at least for those tests), sequentially or otherwise.

Thus, the testing of devices such as ICs, SOCs and/or MCMs, i.e., DUTs 10/1000, may be implemented utilizing an otherwise conventional ATE 21, which may be enhanced by the inclusion of the present test set-up capability (e.g., software, program(s) and/or development tool(s)) in or in cooperation with the conventional ATE 21 which may provide for example, and not by means of limitation, one or more of the following test capabilities, including: the ability to measure time, voltage, current, resistance, capacitance, inductance, frequency and/or jitter, inter alia; the ability to measure, at specified times, voltage, current, resistance, capacitance, inductance, frequency and/or jitter, inter alia; the ability to provide data; the ability to drive data at specified times; the ability to receive data; the ability to receive data at specified times; the ability to provide reference voltage; the ability to sink or source current; the ability to provide high impedance; and the ability to calibrate in relation to ATE, among others.

As described further herein, parallel testing of multiple independent devices installed on a single substrate, as the previously discretely extant chips 1100a and 1100b in an MCM 1000 (or core(s) 11 in and SOC 10), for example, may result in a more efficient device test than simply running each test serially. Parallel execution can result in faster execution time(s). Further time savings can be provided in the streamlining of the test development process as well as in the overall actual test time by the joining of any pre-existing tests for these previously and yet still functionally independent devices (e.g., previously discretely extant chips 1100a and 1100b in an MCM 1000), into a single new parallel test. Hereafter follows a description of apparatus (e.g., tools), systems and/or methods for combining and/or converting two or more existing tests into a new single test. In exemplary embodiments, these take advantage of concurrent or parallel execution features, as for example where a working test can be integrated with one or more other working device tests using multiple port features in an automated test environment (e.g., ATE 21). Such parallel test features allow for execution of different tests for different Intellectual Property (IP) cores (e.g., cores 11) with, in some embodiments, independent timing. In the case of Multiple Chip Modules (MCMs) 1000 where multiple previously independent devices (e.g., chips 1100a and 1100b) are combined on a single substrate (e.g., substrate 1001), the tests for each such otherwise independent device can be run in parallel. Each device (chip) may then effectively become a new core (like cores 11, FIGS. 2 and 3) on the combination device 1000. Often such combination or MCM devices are made up of devices (chips, ICs, SOCs) that have otherwise been in production for some time previously with working tests already developed and used therefor. And, since comprehensive IC/device tests can take months to develop, it should prove extremely beneficial to reuse the previously developed tests, along with the previously extant devices/chips. Note, hereafter, reference will be made to previously existing devices which phrase is intended to encompass pre-existing chips, ICs, SOCs and the like, as well as previously existing cores, inter alia, each of which having a corresponding pre-existing test associated therewith and each of which being incorporable onto a substrate with one or more other previously existing devices to create an SOC or MCM or like device which can have a single device test created in accordance herewith.

In a process for joining two or more pre-existing tests, there may be considered to be three general steps; namely, first, reviewing the pre-existent tests by timing and determining/deciding how to organize a combination; then, second, actually combining the subtests, including combining the separate setups of vectors, timing and levels; and finally providing the test programs or methods to run the newly combined subtests. Another way of summarizing may include three primary considerations; namely, first, performing a timing comparison, second joining the device setups into a single setup, and third, joining the test execution sequences into a single parallel test execution or test flow to achieve a faster overall test time. An exemplary description of how a device may be defined and tested follows using particular terms which will be used throughout the rest of the process description.

For example, the phrase device test will herein be intended to mean the software and firmware instructions required to control the electric or electronic stimulus or stimuli provided to and the analysis of the response(s) received, if any, from the device under test (DUT) 10/1000. Thus, a device test is the entire test protocol and/or program for a device whether the device is a pre-existent IC or SOC device 10 or an overall combination MCM device 1000 (a device 1000 or the like which is the resultant device of a combination as described herein may be hereafter referred to as an overall device or a combination device or a resultant device, or the like). A device test may include one or more of a number of otherwise individual tests, hereafter referred to as subtests or test elements (in other art references such subtests or test elements may be referred to as "tests"; as for example when the otherwise separate voltage, current, resistance, capacitance, inductance, and/or frequency "tests," inter alia, may be delineated as separate elements in an overall test sequence and separately referred to as "tests" there; however, these same elements will be referred to here as subtests or test elements to avoid confusion with the overall device test which includes the entirety of subtests desired for a particular device). As it may include many parts, a device test may also be referred to as an overall device test herein.

Test vectors include the electrical, often digital signals or stimuli sent to the device under test (DUT) in pre-selected patterns, wave shapes, levels and/or periods/timing intended to elicit test response signals (or particular lacking(s) thereof) from the DUT. A device test and/or a subtest thereof may then include a number (at least one) of test vectors, including stimuli or inputs (at least one) and/or responses (zero or more) which can then be interpreted to determine the passage or failure of the test by the DUT. ATE 21 may be used to provide such vectors, which may include generating and sending the stimuli and/or receiving and/or analyzing the responses.

A test protocol may then be the compilation of steps necessary to accomplish the test, whether of the overall device test and/or the subtest(s). These steps may thus include the provision of test stimuli and/or receipt and/or analysis of test responses. A test protocol may be for the overall device test or limited to any one or more subtests. A test sequence is the ordering of subtests or test elements in an overall device test. This might also be referred to as a test flow or execution or process, particularly when viewed in a flow chart format. A test program is the software or firmware incarnation of the test protocol (or protocols) and/or test sequence making up the overall device test. Test code refers to the computer instructions in the test program and can be representative of the code for the entire test program or portions thereof. Thus, the term test code portion refers to one or more portions of the overall test code. Test code and/or a test program may be embodied in a computer readable media as that term is described in further detail below. A test development tool may include the software, computer program, computer readable media, firmware and/or hardware which may be used to create and/or verify a device test and/or any test element thereof. Note also that the term development may be used with many of these other phrases to indicate the creation and/or verification of the new tests and/or subtests.

Figure 5:
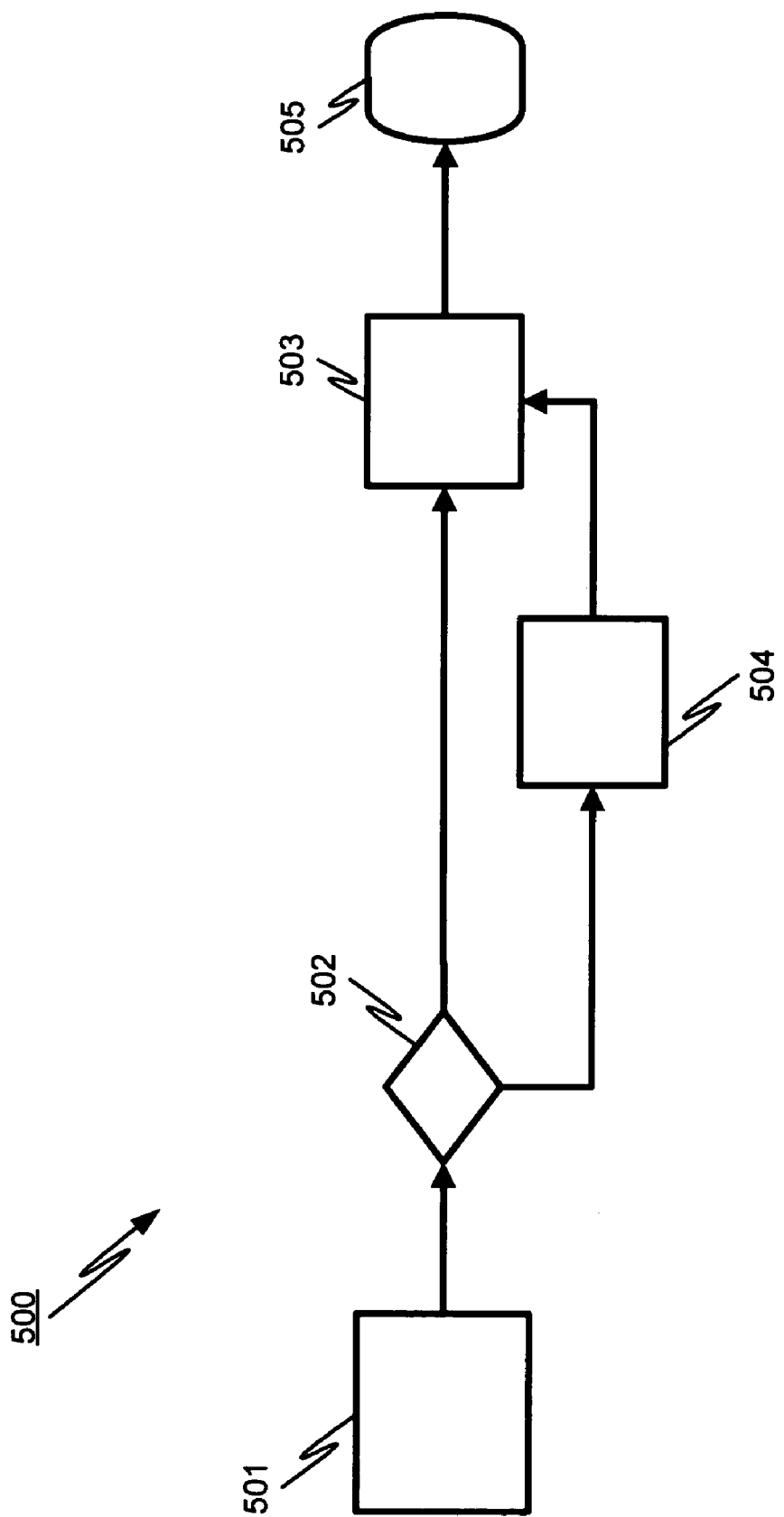
FIG. 5 is a flowchart depicting a testflow for testing a device using automated test equipment.

For further understanding of the conventions to be used herein, FIG. 5 presents a schematic view of a testflow 500 which is in the general form of a flow chart (though represented horizontally). As such, this flow 500 could represent an entire test flow with one or more subtests, or only a partial flow. If it is an entire flow, it may thus also represent an entire overall device test, which consequently may also be identified by the reference numeral 500. In either case, a number of elements are included here, as for example, the boxes 501, 503 and 504; the decision diamond 502 and the curved shape 505 which is here intended to represent the end of the test flow (or at least this portion thereof when such a curved shape might indicate a jump to another test flow at a corresponding curved shape or other designation). Box 501 may represent merely a start for the flow, or it may also represent a subtest, in which case it, like those subtest elements 503 and 504, would then include subtest protocol(s) which would in turn represent the steps of the electrical stimuli and responses or results and potentially also analysis thereof. In any event, the decision diamond 502 may represent a logic element such as an "if/then" or a "goto" control element or both, which may then direct execution flow from first block 501 either directly to subtest 503 or first to subtest 504.

Each of the individual test elements or subtests (e.g., 503 and 504; and in some embodiments also 501) may then also have definitions thereof including not only the stimuli and results (digital inputs and responses which together are also known as vectors), but also timing and voltage level definitions which may be selected for the particular DUT. Analog testing may also be performed, in for example a mixed digital and analog test. If so, then the subtest will also want to have the analog setup and controls defined therein as well (usually, an analog test involves the use of digital signals and responses which are communicated to and from the DUT as such even though they represent and/or actually test analog portions of the DUT). Thus, analog execution and results definitions may then also be defined in each such subtest which incorporates an analog test portion.

Further, each device test whether for the combination device 1000 or for each device 10 which may now be a sub-device (e.g. chips 1100*a* and/or 100*b*) or component of the combination device 1000 as joined for the new multiple device/multiple core combination device test will have an existing working device test description. To combine two or more previously existing component device tests into a single overall device test, the respective setups and definitions of the respective previously separate devices (e.g., devices 10 or 1100*a*, 100*b*) will be combined into a new overall device test, in many embodiments with the same structure. Each individual part, i.e., each device has a working definition made up of various elements such as the inherent pin definitions and resource assignment(s), as well as the voltage levels and timing details and hence also the digital signals or vectors for normal operation of the device. Moreover, if the device has any analog parts or analog functionality(ies), then the device will also have some analog definitions such as what may be the analog instrumentation, how to interconnect the device for analog access (electrical communication) and/or how to communicate and/or display analog results. These previously existing device definitions may be joined together in single set of test definitions, keeping the devices independent by using port definitions.

Each previously separate yet newly incorporated device (e.g., previously separate devices 10 or as incorporated devices 11*a*, 11*b* or 1100*a*, 1100*b*) will become defined as and/or assigned each to its own independent port 18, so the previously separate test can be run in parallel with the previously separate tests of other previously separate yet newly incorporated devices (e.g., devices 11*a*, 11*b* or 1100*a*, 1100*b*). Such a port assignment allows for dissimilar timing for the electronic test stimuli, e.g. vector periods, independent vector sequences, and parallel execution.

How to assign the devices, pins and ports next will likely include some analysis of the pre-existing device tests to determine appropriate parallel test opportunities. Opportunities of, for example, combining the longest test sequences of each previously separate device will be looked for to achieve maximum efficiency. The device tests (overall device test and subtests) herein may generally be defined by a combination of test flow, and individual subtest setups and results analysis. To merge two different pre-existing device tests, into one overall device, decisions should be made on how best to combine the various test activities. In the case of concurrent testing of both devices, enabled by multiple ports, the tests will preferably be combined in the most time efficient manner. This may involve a combination of user input, and automatic analysis. An automated test development tool (which may be a part of a more comprehensive test development tool) may be used to show the time consideration of each subtest. The user may then be involved to ensure the behaviors of all of the devices (the pre-existent and the combined MCM-type devices) are appropriately considered and the desired test strategy would then be met.

In some cases, the user may alternatively keep the individual subtests in a serial flow, and in such a case, the two (or more) previously extant test flows can simply be joined as they are, with a first pre-existent device being fully tested according to the first pre-existent test flow, followed by an execution of the test flow for the second pre-existent device. However, an often desirable option for organizing the combination device test is creating parallel execution of two or more independently operating testflows operating on two or more ports. Creation of parallel subtest executions would in many cases, provide a parallel device test which would be more efficient time-wise, and thus more desirable in many instances. Methods, systems and/or apparatuses to achieve such parallel tests of such multiple pre-existent devices, yet now combined into an overall device will now be described in more detail.

When a parallel test may be desired for the overall device test resulting from the combination of the pre-existing tests, the process will usually include creation of one or more overall device subtests that execute the corresponding pre-existing subtests concurrently. Thus, a subtest, e.g. subtest 503 (or subtest 504, or both) of the final overall test 500 as in FIG. 5, may thus be created to include two or more subtests from the pre-existing device tests (one or more subtests each from each of the plurality of pre-existing device tests). Such conversions will be described further below.

Oftentimes, the first step to create a parallel execution combination device test out of two or more pre-existing device tests, is to perform an optional strategic analysis to determine optimal pairing(s) of pre-existing subtests taken from the pre-existing device tests. A desirable aspect of joining two or more pre-existing device tests for the fastest possible combination device test execution time is to join similar test time subtests of/from the respective pre-existing tests of the two devices to operate in parallel in the combination, overall test. This should be done without affecting the appropriate behavior for either the pre-existent/now combined device or the resultant/combination device. The first consideration can be handled manually or substantially automatically (e.g., by computer program as a part of the development tool) by the application of algorithms to determine the test execution time of each of the subtests of the pre-existing device tests. The second consideration, i.e., the actual creation of the most efficient test combinations, may similarly also be performed by a test engineer or by computer algorithm. Automatic analysis of the test time of the existing subtests will vastly improve a user's manual process. The overall execution time of the overall test flow can be automatically predicted or determined primarily by evaluation of the following estimated times: the overhead of timing/level specification changes; the digital sequencer time based upon the total vector count per test multiplied by vector period; and analysis of analog results. To choose a more desirable, i.e., more efficient combination, the tool may review the above issues, and then make suggestions of efficient combinations. Any user-defined sequence dependent tests may be programmed to be respected and not reordered. After analysis, the tool may be adapted to show the suggested combinations in a spreadsheet-like or other tabular (or even non-tabular) presentation of corresponding times as shown, for example in the following table, Table 1, as set forth below. Alternatively, in a more manual application, actual test time(s) from an actual test protocol execution of the original test can be used in such a table, as Table 1 (substituting actual run times for the estimated test times shown below).

TABLE 1

| | Device A -- Port A | | | Device B -- Port B | |
|---|---|---|---|---|---|
| COMBINE X | Original subtest name | Estimated Time | COMBINE X | original subtest name | Estimated Time |
| R | STD_UMC_2 | 70.532 | R | Leakage | 69.926 |
| S | UMC_4 | 70.43 | S | AD8_Q_FFT | 50.757 |
| T | UMC_3 | 70.422 | T | AD8_I_FFT | 41.348 |
| | STD_UMC_5 | 70.344 | | Clamp_coarse1 | 31.53 |
| U | STD_UMC_6 | 70.316 | | Direct_cont | 26.813 |
| | Pin_bist_min | 68.568 | U and ↓ | nandtree_min | 24.657 |
| | Pin_bist_max | 68.25 | U | PLL_max | 24.55 |
| | IIL_IIH_Pull_Down | 54.163 | | Func_iddq | 24.082 |
| | sparc_bist_min | 44.763 | | scan_nom | 21.953 |
| | sparc_bist_max | 44.562 | | scan_min | 21.417 |
| | IIL_IIH_schmittb_tc | 44.301 | | scan_max | 21.266 |
| | sparc_ram_max | 44.276 | | Con_videoin_PMU_1 | 20.943 |
| | sparc_ram_min | 43.28 | | Clamp_fine | 20.619 |
| | STOP_TEST | 41.956 | | Ana_cnt_ifl2 | 20.354 |

The user may then be able to select or reject the combinations suggested by the computer tool. The user may thus also be provided with the capability to assign and/or reassign combinations (e.g., if no computerized timing analysis is performed). As shown, the subtests may have names like "STD_UMC_2"; "UMC_4"; "nandtree_min"; "PLL_max" and/or of many other forms, and the subtests may be identified, i.e., sorted or filtered by device name and/or port name and/or original subtest name. The table shows the expected test time for each subtest, as shown. Such a table could also show other information such as the timing/level setups and vector count with or in lieu of the expected test time. Any unpredictable sequencer behavior, such as waits, loops, etc. may be discounted in the timing comparisons.

As shown in the exemplary Table 1, there are four suggested example combinations; namely, the "STD_UMC_2" subtest from the pre-existing testflow for Device A/Port A with the "Leakage" subtest from the testflow of Device B/Port B (each shown with a corresponding variable "R" for the combination); "UMC_4" from Device A with "AD8_Q_FFT" from Device B (variable "S"); "UMC_3" from Device A with "AD8_I_FFT" from Device B (variable "T"); and "STD_UMC_6" from A with both the "nandtree_min" and the "PLL_max" from B (variable "U"). Though not shown in Table 1, still further combinations of subtests may be suggested and then ultimately made; e.g., all or substantially all of the subtests of one pre-existing device test combined with at least one (or more) subtests from the other pre-existing device test.

In many embodiments, after selection of the new combinations of tests (i.e., usually when the user has approved the correct combinations), the development tool may be adapted to or made adapted to automatically or otherwise create the combination specs and vectors required for the new individual subtests of the combination device test. Then it may actually write conjoined test method execution instructions. In a more particular example of what the tool may do to accomplish this, two (or more) subtests may be automatically (e.g., by computerized tool) combined (or suggested combined as shown in Table 1, e.g.) using a sequence of steps; such as:

Creation of a new test flow, with names representing the different cores.
Creation of new individual subtest instructions to execute the individual subtests.
Combination of basic data setups.
Configurations
levels*
timing*
analog setups
port vector sequences
Combination of timing and vector sets from each device test to new multiple port setups.
Creation of combination timing specs*
Creation of combination vector streams
Final debug and user customization—often a manual process.

As will be described further below, these asterisk marked steps may be codependent on individual subtest combination(s) in particular ATE systems such as for the Agilent 93000™ ATE (described further below).

Figure 6:
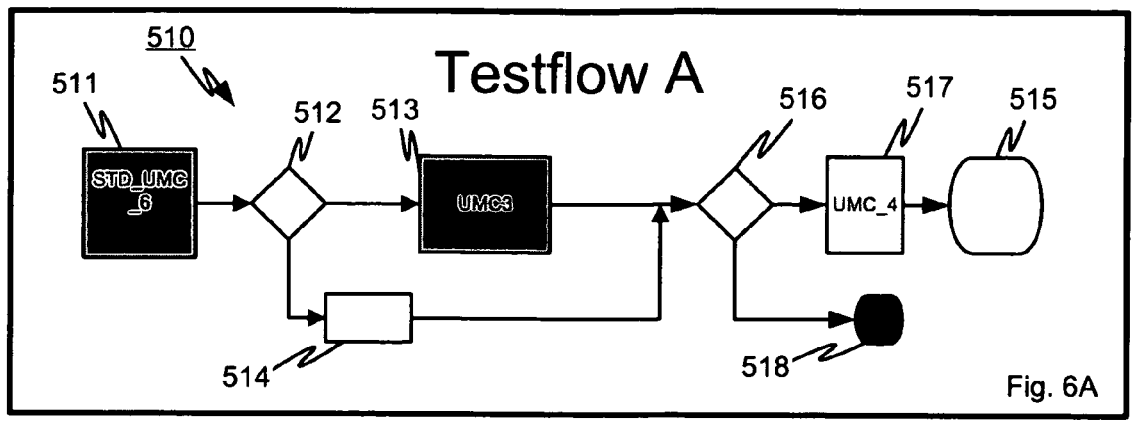
FIG. 6 is a set of flowcharts, including FIGS. 6A, 6B and 6C, depicting two separate testflows and a combination testflow thereof, respectively.
Figure 6:
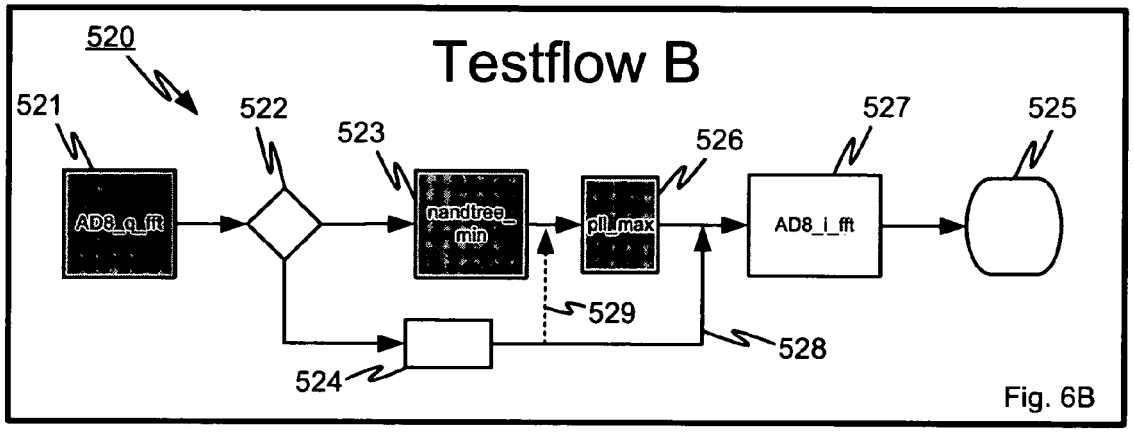
Figure 6:
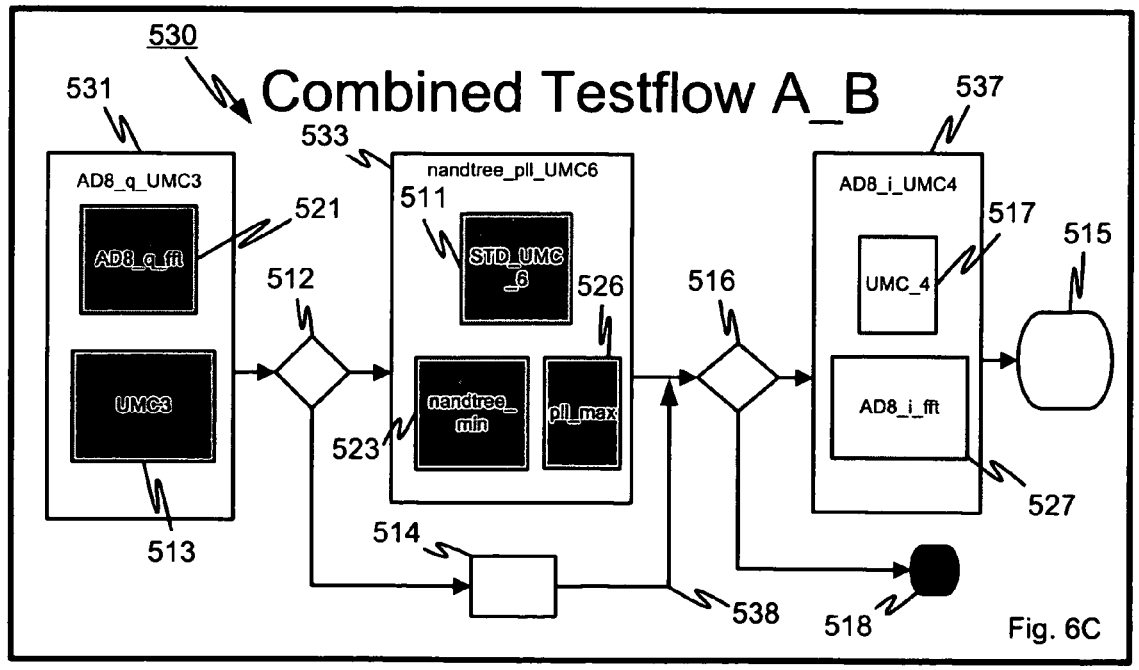

The new test flow, i.e., the combined device test testflow will be made up of new subtests created by combining the individual subtests from the pre-existing device tests that are selected to run in parallel. The combination(s) of subtests may occur during the creation of a completely new testflow using a testflow development tool (i.e., software/hardware for creating the test program); and/or, the combination may occur generally as shown in FIG. 6 which is described in further detail below. In one embodiment (see FIG. 6 description below), the user or tool may select one of the original, pre-existing test flows to be used as the starting point. The development tool hereof may then be used to capture an original test as by, e.g. copying that original test or simply using that test and renaming it to or with a new name reflecting the two pre-existing tests to be combined. This selected test flow may also be called the base or dominant test flow. The overall test execution order will then be substantially dictated by as it comes from this user selected base test flow (though it may be that this would still be editable). This would in many cases be opposed to the execution order being defined by a user interface, computerized test development selection chart from a pre-existing test development tool.

Next, the subtests existing in the base test flow may be renamed to reflect the new combined device or subtests representative thereof (though this may not be necessary, as the subtests may still be used to test only that pre-existing, yet newly incorporated device, or even if combined with a subtest from the other pre-existing device, the pre-existing subtest name or names might still be sufficiently distinctive or even still sufficiently reflective of the new combined subtest even in the new combined device). Then, after the selected test flow is updated with the new subtest names, if this step is so performed, the user may be able to make any adjustments to the test flow as desirable or perhaps necessary. The actual combination of the subtests (see Table 1) may take place at this point (before, during or after) the selection of the dominant testflow and the naming of the new subtests. Indeed, the new subtests, when these are combinations of subtests from each of the pre-existing testflows, these may be appropriately newly named in a manner reflecting the combination as shown in FIG. 6 (see for example the subtest combinations in FIG. 6C with the new test names "AD8_q_UMC3"; "nandtree_pll_UMC6"; and "AD8_i_UMC4" which are reflective of the combinations of the respective subtests "AD8_q_fft" with "UMC3"; "nandtree_min" with "pll_max" and "STD_UMC_6"; and "AD8_i_fft" with "UMC_4").

The three views of FIG. 6 (FIGS. 6A, 6B and 6C) show how the automated process might work in an exemplary embodiment. In particular, a testflow, taken from either of the testflows A or B; here shown taken from the testflow A as will be described, is selected as what will here be referred to as the dominant or base testflow, here testflow A 510 (FIG. 6A). This may occur before after or during the timing analysis (if so performed) exemplified by the results reported in Table 1, see above. Then, the subtests are combined in the manner either suggested by the tool hereof (as from Table 1, for example) or as assigned by the operator. Subtest names may be added/renamed here as well (before, during or after the actual subtest combination process). This testflow subtest combination part of the overall process may be the most manual, operator-involved part, because the new test strategy may be desired to be (or have to be) changed with the new combination device, and the parallel subtest combinations and subtest sequence will likely need to be planned by the user.

More particularly, in reference to the exemplary, non-limiting embodiment of FIG. 6, note that the base testflow is taken from testflow A 510 (FIG. 6A), which here has three example subtests 511, 513 and 517 (named "STD_UMC_6"; "UMC3"; and "UMC_4" respectively). Testflow A 510 also has two decision diamonds 512 and 516 and thus two subordinate flow elements 514 and 518 and a flow stop element 515. Similarly, testflow B 520 (FIG. 6B) has several subtests 521, 523, 526 and 527 (named "AD8_q_fft"; "nandtree_min"; "pll_max" and "AD8_i_fft" respectively); with one decision diamond 522 and one subordinate test flow element 524. A stop member 525 is also shown. Then, in an ultimate combination as in FIG. 6C, a first subtest element 531 is created (with the new name "AD8_q_UMC3") from a combination of the respective subtest elements 521 ("AD8_q_fft" from testflow B 520) and 513 ("UMC3" from testflow A 510). Note that although the first testflow A 510 was chosen as the base testflow, the first subtest element 511 thereof may be determined not to remain in the first testflow position as shown here. Rather, as shown, this first subtest element 511 ("STD_UMC_6") has been moved to the second combined testflow position 533 (FIG. 6C) as a part of the newly created subtest element 533 (named "nandtree_pll_UMC6" in the example of FIG. 6C). Here, this subtest element 533 also has shown combined therein the two subtest elements 523 and 526 from the second testflow, testflow B 520 (from FIG. 6B). The third new test element 537 (named "AD8_i_UMC4") is a combination of the subtest elements 517 and 527 ("UMC_4" and "AD8_i_fft"; respectively from testflows A and B 510 and 520). Other combinations of subtests are of course possible (note, these combinations mirror those suggested in Table 1 for illustrative purposes, but not for any limitation thereof).

The decision diamonds 512 and 516 from the base/dominant testflow A remain in the final, combined testflow A_B 530 (FIG. 6C), if so desired. Similarly, the stop element 515 remains as do the subordinate testflow elements 514 and 518, also if desired. The operator may be allowed to remove or move any such element as so desired. Note, the subordinate test elements 514 and 524 might represent subtest elements or other functional elements, and they may represent a substantially similar sort of element intended to jump the second, and perhaps also the third subtest element, here e.g. elements 513 and 523 and possibly also 526. An interesting issue suggested here by the alternative return flows 528 and 529 (dashed lines) in FIG. 6B is that if the optionally presented return flow 529 is the desired return in testflow B 520; then, a question might arise as to whether the combination of subtest element 533 makes sense with the inclusion of subtest elements 526 therein. More particularly, would the combination subtest 533 be desirable with the subordinate flow return 538 also skipping the previously not skipped subtest element 526? Thus, this may suggest a situation in which it may be desirable to overrule the initial suggestions of the automated tool hereof which in developing its suggestions (see Table 1) may not have analyzed these flow scenarios (though, it could be that the tool is made to make these analyses as well). Note further, the element 518 could represent an alternative stop or other functional element.

The next step, after the subtests are selected for combination (Table 1) and organized for desired sequencing (FIG. 6) for the most time efficient execution, is to then actually create the new subtests for the new overall device test. As mentioned above, though combined in combination subtests (e.g., 531, 533 and/or 537 in FIG. 6C), the original subtests from the previously separate testflows (e.g., testflows A 510 and B 520; FIGS. 6A and 6B) may be desired to retain their original statures (i.e., constructs or assemblages) to a large (or perhaps only a small) degree and thus continue to operate or be adapted to operate substantially independently (e.g., via an independent port, see below) of the other subtest(s) combined therewith. In this way, the original subtest may continue to be run for the particular original device (or core) which itself may retain most if not all of its original character but for being incorporated onto a common substrate with another one or more other original device(s). One way in which to accomplish this might be to define such an original sub-device and a corresponding original subtest to a particular port in a multi-port environment, as for example is provided by conventional ATE's. Thus, in one example, in a combination device 1000, a sub-device A 1110a may be defined to a port A 18a (see FIG. 4, e.g.) and a sub-device B 1100b may be defined to a separate port B 18b (see also this sort of ported or port-wise separation of subtests in Table 1). Then, the subtests for device A might be made to run concurrently or in parallel with those subtests of device B.

In some embodiments (as for example, with the Agilent 93000™ ATE, available from the assignee of the present invention, Agilent Technologies, Inc., Palo Alto, Calif.), an actual parallel test may be accomplished with a form called testmethods (note, a testmethod here is a particular computer implemented program or set of instructions to particularly run a particular test or subtest; as contrasted with any sort of less particularized method for performing any task, including methods for testing or setting up a test for a device/DUT which may include elements or steps outside of and/or separate from a computer or computer implementation). Such testmethods as used here may be C++ or like computer programs that are compiled to create and/or run or execute the actual subtests. In many cases, the original subtests may be in a simpler or perhaps simply in a different computer format. To combine two dissimilar pre-existent tests may require a testmethod to instigate, keep track of, measure, and report the different test results of the two cores. For these, the transition may be more complicated. Testmethods are usually customized computer programs which perform or run instructions which are in the setups and/or specifications, and thus execute each step in or relative to a particular subtest. Though often associated with the respective subtests, it is possible for a testmethod to be used in more than one subtest of a testflow. Testmethods may be used to control the overall test sequence including initiating the waveforms and controlling the voltage levels and timings of each subtest. The testmethod(s) also receive the response signals and perform the analysis thereof to determine the passage or failure of the subtest(s). Parameters (e.g., as signal or waveform vectors) are passed in and out of the testmethods to interact with the DUT and provide responses thereto. Constructs are the format or framework within which the testmethods may operate. In many situations, libraries for testmethods may already be pre-existent or may be newly created as desired. The user may search for appropriate test libraries. The tool hereof will in some embodiments be adapted to suggest testmethods by analysis of the pre-existing subtests. For example, if two straight digital subtests are combined, the tool may then be adapted to automatically find in a library, or create an appropriate testmethod. If analog testmethods are combined with digital, the tool hereof may then be adapted to write a new testmethod, suggesting to the user the required constructs, i.e., the framework for the testmethods to be created. In many cases, this will be substantially the last stage of the test development using the tool hereof, i.e., when the testmethods are found in a library or created. In this last phase (i.e., the combination of the setups/specifications and creation or at least matching of appropriate testmethods), the user will usually also have an opportunity to improve and/or often will need to modify the suggested testmethod, test execution and results analysis.

However, usually prior to such testmethod creation/selection, yet after the test protocol and subtests are created, the pre-existent subtest setups must be combined. These combinations are determined by the selected set-ups and the individual subtests. All steps past this point depend to a greater or lesser degree on the combined subtest. In the combination of two (or more) subtests, the setup selections of both original subtests may be combined in the form of new constructs for a newly combined parallel subtest. Once the subtest elements are combined, the setup elements may in some embodiments, be automatically combined. If the user decides that these subtest elements may be run together, then the setups don't have to be re-done. In any event, most of the original timing setups can be combined directly—with each port having an independent setup. These may be independent of the subtest utilization. Then, the set of port setups to be used for the combination of subtests, may be called or selected based on the content of the original subtest. For example, one port may have several equation options. These may be translated directly, simply by adding a definition statement identifying the port name. The specifications to be used may identify the port equations to be used, and the value of the variables in the equations. Voltage Levels may be handled in a similar manner; however, in some embodiments, these levels may not be ported, i.e., the levels may instead be defined independent of the ports (see e.g., the 93000™ ATE introduced above), and thus apply to the entire device. Even so, the combining of the pins into single level equations will be better adapted across the device given information about how the subtests will be combined to make new, parallel subtests.

The combination of port based timing definitions and vector (electronic stimuli patterns and/or waveforms) sequences should also correspond with the port-based specifications to identify which definitions go with which port. These are constructs likely not used in the original, non-ported test, and would thus be created during the creation of the parallel port definitions. When devices are tested in parallel, the timing and vectors will then be defined for parallel operation. The multiple port timing specifications determine how to combine timing equations and waveforms for the two (or more) previously separate, now sub-devices. The multiple port vectors combine the digital vectors to be applied to each device. Both should be combined in consideration of how the new subtest is pulled together from the original subtests.

A possible first step in the creating of the new data setups for the new combination subtests (e.g., combo-subtests 531, 533 and/or 537 in FIG. 6C), may be to create a pin configuration out of the two (or more) original pin configurations from the original subtests from the previously separate testflows (e.g., testflows A 510 and B 520; FIGS. 6A and 6B), and then assign ATE ports for each. As described herein, both (or more) of the previously separate, original devices come to the present combination creation with testflow definitions of the pin configurations that identify which test port is used for or assigned to which device pin.

The simple basis of ported testing is defining ports containing the digital test resources to be applied to each core/original device to be subjected to the particular subtest. Test resources are generically the physical features, the hardware of the tester, i.e., the ATE, which are the actual parts to which the pins or pads of the DUT physically/electrically connect and thus through which the ATE electrically communicates with the DUT. The ports are the re-definable electrical definitions of the groups of resources which correspond to each other for particular purposes, as for example, a group of resources relative to a particular test, or relative to a particular core or MCM part or sub-device. In the simple case, each core/original device will be defined to a separate ATE port. In some cases, signals to the ultimately combined device substrate may be routed simultaneously to both cores/original devices, as they may have common stimulus requirements. These signals, particularly clocks, may thus be defined to be communicated to and through one or more separate ports (i.e., ports separate from the ports to which either of the devices/cores is primarily defined) which are defined/assigned to communicate with the common pins of all of the corresponding cores/original devices. This separation then allows independent control of these one or more separate ports; control which is independent of the operations occurring on and through the primary device ports. This may be desirable in some embodiments in that the ports may provide independent clock periods for devices/cores of dissimilar timing.

For the common case where each core/original device is defined to communicate to and/or through a single port, creation of the new overall pin configuration and resource assignment may be relatively straightforward and may be automated, though it may, in many cases, remain preferable to have an operator verify or validate any suggestions by the tool. User intervention may be preferred in many cases in order to allow for selecting the best pins for any conflicting resources. For example, the tool hereof may be adapted to use the existing pin configuration for the largest pin count device, unless otherwise instructed by the user. For example the pin definition and resource assignment of a first device (e.g., device A) may be used as the starting point. Then, the next device configuration, e.g., pin definition and resource assignment, may then be merged in. Thus, the configuration of a second device (e.g., device B) may be merged into the configuration of the first device.

A next step could be then to determine if there is then any duplicate resource assignment. I.e., a search would be performed (by computer or user) to see whether there are any duplicate channel assignments and then reassign a duplicate assignment to any empty channel cards (cards are the hardware features, digital boards, which hold the resources) which may be available in the ATE system configuration. The tool may then substantially automatically transpose or prompt the user to re-assign the conflicting pins to the new card in the same order as the original configuration. If, in a given situation, the pins must be assigned to various boards with unused resources, the tool may itself or the user may be given the opportunity to assign the remaining pins to the available resources by hand. The same sort of process may apply to analog definitions/resources; a search for duplication is first performed, and also a search for corresponding open ATE channels/ports, and if new/unused analog cards are included/available that match the original they may be used. Otherwise, the tool may itself or it may give the user an opportunity to add and/or interconnect to available multiplex (MUX) lines of the analog instrumentation. The general process for combining the original pin assignments into a pin assignment for a new combination device test may then be completed; generally device A to port A and device B to port B and any common pins or clocks to a third (or more) port(s) C, e.g.

Other sub-processes may also be performed as in assuring all desired pins are assigned to a port, and/or ensuring that pins are not undesirably multiply assigned to multiple ports, and/or ensuring that there are no duplicate pin names. These sub-processes in pin/port assignment may be user performed and/or interactively performed with a tool (or a part of the overall tool hereof), as for example where the computer software tool instructs a search for any of these conditions (non-assigned or multiply-assigned or duplicately-named pins) and then identifies these for the operator and prompts for correction/re-assignment. In a duplicately-named pin situation, it may be that one (or more) pin from each of the previously separate devices may have the same name, and this may be indicative of the same or substantially similar function (e.g., clocks), and this may be indicative that a separate port may be desirably created for these pins and these pins then assigned thereto. Otherwise, the pins may need to be re-named and/or re-assigned. The user would also add any additional resources that may be required or at least desired for full testing before moving on to combining the other data setups. Items may include additional pins and ports that link the devices, utility lines for control of the test or load board relays, and any additional analog instruments.

For digital subtests, the vectors brought from the original subtests may be joined into a combination of labels for two or more ports, i.e., vectors at certain times are defined by labels, which are groups or sets of vectors. The labels are then assigned to/with ports with/via the respective port names. The labels may be collected into groups, sometimes called bursts (as in the Agilent 93000 ATE referred to/described herein elsewhere). Then, each subtest may then contain a pointer to point to one or more particular label(s) or group(s) of labels (i.e., burst(s)). In the combination subtest created from, and having disposed therein a combination of two or more previously extant subtests would then likely have two or more different pointers to point to two or more different labels or groups of labels. It is possible that the two or more previously separate subtests, after combined may provide a single pointer pointing to a single label or group/burst of labels. This combination, though pointing in different directions, nonetheless yields a combined single test sequence.

Note, herein described is a process/tool in which ports are defined first, often as a direct result of the cores/devices incorporated onto the DUT, as a consequence of the pin pattern defined by the cores/devices on the DUT. As mentioned some common pins are also formed in such a default situation. Then, the primary steps of the process/tool hereof are entered into, i.e., the best timings for combinations in a combined flow is first performed/performable (note, preliminary port definition may also in some alternatives be a part of the primary process/tool hereof). Then, in some embodiments, port definitions may be altered or adjusted, or simply defined for the first time (if not, as may be desired in certain situations, previously so defined). The concept may be that after the timing decisions have been made as to which subtests to combine, it may in certain situations prove profitable to then determine port definitions. Otherwise, then (or perhaps substantially simultaneously therewith), the other automated or semi-automated steps may be performed such as the subtest set-ups. In some other embodiments, it may be that certain setup steps and/or even the testmethod establishment (see below) may be performed before the port definitions or final port adjustments are completed.

In the combination of subtest setups, other than the port definition and/or vector issues discussed hereabove, the combination of the voltage levels and timing to be used in the new overall parallel device test is more straightforward relative to vector combinations, as the port definitions have less influence. As introduced briefly above, it may be common that the levels will need no port definitions. It may still be that such levels may be defined for each port, however, if they cannot (or simply desired not) be port based, any different level specifications (specs) from the previously separate sub-devices will still be combined appropriately for the sub-test combination. Voltage levels in the level tests generally do not have port specific definitions (though in some alternative embodiments these, like any test parameter, could also be port specific). Similarly, timing may be straightforwardly defined, although, this will likely be port-based; i.e., timing from the original testflow for a first device (e.g., device A) may be used for and thus define the timing for the corresponding port for that device (e.g., port A). The respective pre-existent timings for the other device(s) (e.g., device B, etc.) may then similarly be used/defined for the ports of such device(s) (e.g., port B, etc.). Timing may then create a powerful period control in/for the multiple port specification. Timing may include timing specifications, edges and/or equations and yet all of these may be transposed to the new port definitions/assignments. New timing issues may also be addressed, as for example discrepancies due to incompatible periods, required keep-alive clocks, and/or other critical timing concerns. Numbers are often used to identify each element of the timing. Since the timing settings may be linked to the ports, all such numbers may remain the same, except the multiport timing specification.

The timing equations and waveforms from the respective original, pre-existing devices may also be translated directly into port-based timing. The timing specifications from each individual subtest will be combined into a multiple port timing specification as defined by/in the new combinational subtests.

Figure 7:
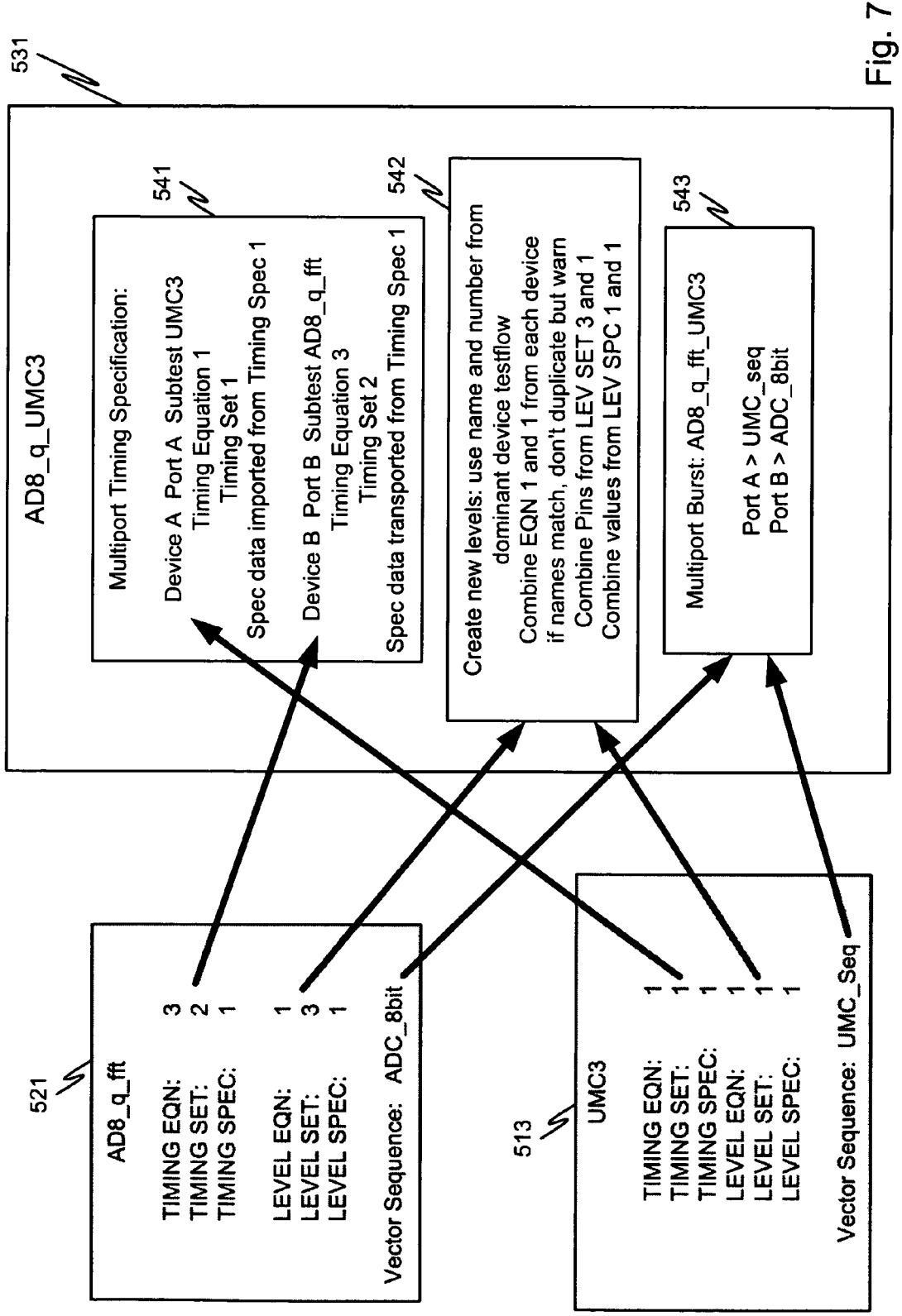
FIG. 7 is a relational diagram depicting a conversion of two previously existing subtests to a final combinational subtest.

The timing setups, i.e., specifications, for both (or more) of the original, previously-separate device tests may be combined in the form of a single, combined multi-port timing specification for the combined test. Since independent period definition (i.e., independent for each port) is a prime benefit of a port based device test; then, the resultant combination timing specification may often be the most complex and important activity of the combination process. This resultant specification may have an individual setup for each port, the individual setup often being pulled or copied from the previously separate, now, newly-combined device tests. The resultant specification identifies the port with equation sets, wave tables, and specification values as shown in FIG. 7. The example in FIG. 7 (which may be applicable in, for example, the 93000™ ATE environment, inter alia) shows how this might be accomplished in a real system. Original, previously separate subtests 513 and 521 from respective previously separate testflows A and B 510 and 520 (see FIG. 6) are exemplars which are being combined to a subsequent subtest 531 as described above (see FIG. 6). To do so, a combined timing specification part 541 of the new subtest 531 will be created from the timing data from each of the previously separate subtests 513 and 521. Such timing data, though now combined in a new separate subtest specification 541 is nevertheless kept separately define to the respective ports A and B as shown in FIG. 7. As mentioned, the level information may not be port specific; and so, as shown in FIG. 7, a new level specification 542 may be created using the information of the previously separate subtests, but combined here without regard to port or device (again, this could be port/device specific also if for whatever reason discrete levels may be desired). Lastly, the vector sequences from each of the previously separate subtests 513 and 521 will be combined in a combined vector label or, as described above, a multiport burst 543. When the subsequent tests are translated, reuse of earlier defined levels and timing when repeated, create new level and timing specs as needed. The settings inside the subtests may now reflect the appropriate combination for levels and timing.

Figure 8A:
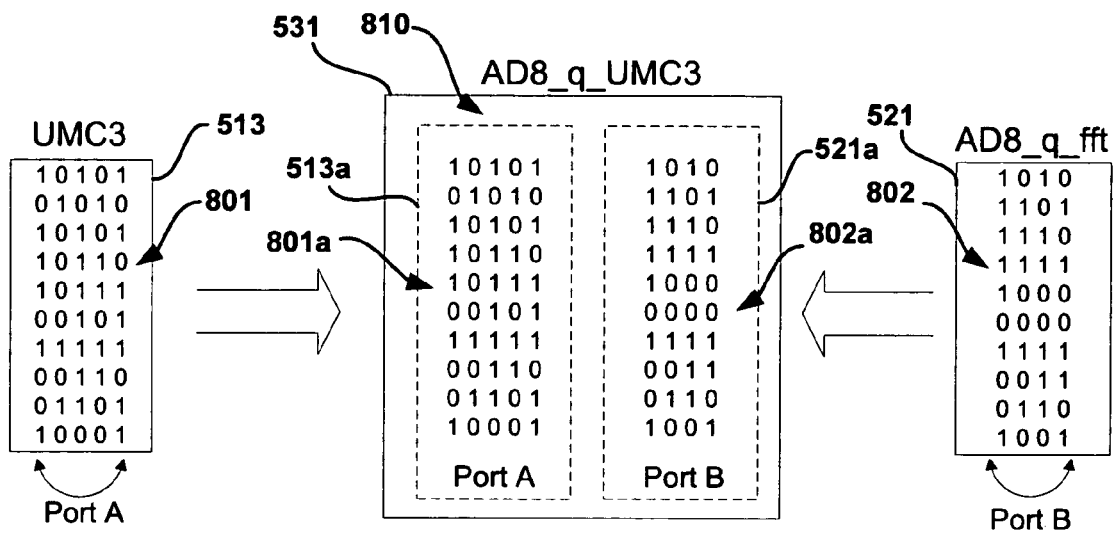
FIG. 8 includes a pair of relational diagrams designated FIGS. 8A and 8B, respectively, each depicting conversions of two previously existing vector patterns of the previously-existing subtests into respective final, combined vector patterns in final combination subtests.

Combining existing digital vectors into port-based vectors may then be the next step. Vectors are the digital values to be applied to individual pins in the hardware sequencer. The original vectors or a set of vectors may be defined by/with vector labels. These vector labels may be called out, i.e., defined directly in the subtests, or they may be combined in what may be called a "burst" of several vector labels. A burst may be a communication of one or more vectors, e.g., one or more vector sets or labels communicated to a single port at a time, or often, a communication of a combination of vector sets to a plurality of ports at the same time or at relative times. Thus, in the creation of the new parallel overall device test, the vector sequences defined within the new subtests may be called out in a multiple port burst. When converting to ports, each of the individual vector sequences or sets from the original, previously separate device tests (and/or subtests thereof) will be assigned the appropriate port identifier so that it will continue to communicate to/with the previously separate device. See FIG. 8A, where for example, there is shown a new assignation of a Port A designation to the previously non-ported original vector set 801 of an original first subtest, e.g., subtest 513 for device A (see FIGS. 6 and 7, from which this is a continuation example) and for device B, the Port B designation to the previously non-ported original vector set 802 of the second subtest 521. Note, in the upper example of FIG. 8A, the original vector sets 801 and 802 are shown as collections of binary data in relative grouped vector patterns initially separate from each other, but ultimately combined in the newly created combination subtest 531. Note also that only the vector sets 801, 802 of the respective subtests 513 and 521 are shown in FIG. 8A, the other parts of these subtests (e.g., timing and levels, etc., see FIG. 7) being omitted here for clarity. In this way, before the ultimate combination into the combination subtest 531 (to be described further below), the original independent vector sets may first be re-defined as they will be related to respective particular port definition/assignment, and yet will thus otherwise remain initially substantially unchanged. The originally defined wave tables or vector sets 801, 802 may then be used in the ultimate combination subtest. More particularly, these original vector sequences 801, 802 may be made directly available in or transposed into the corresponding incorporated vector sequences 801a and 802a in the new ported combination version of the collected vector set 810 of the combined subtest 531. Original vector labels or names may be retained, unless there may be duplicates, at which point, a new definition may be created for one or the other of the duplicates. Vector table definitions may also have to be redefined in these duplicate situations.

The first and second vector sets 801 and 802 of the first and second subtests 513 and 521 and combination vector set 810 of combination subtest 531 made therefrom as shown in FIG. 8A may represent generic vector sets, any of which may be combined as described herein. Or, these vector sets and subtests shown in FIG. 8A may also or alternatively represent vector sets and/or subtests such as those from FIGS. 6 and 7. In this continuing example, vector sets 801 and 802 may correspond directly to, i.e., represent the vector sets from those subtests 513 and 521 also labeled UMC3 from FIG. 6A for device A, and AD8_q_fft from FIG. 6B for device B. Then, the combination test 531 of FIG. 8A would correspond directly to the combination test 531 as shown in FIG. 6C. Both versions are also labeled AD8_q_UMC3 in FIGS. 6C and 8A. Other combinations like this may be made in similar fashion as indicated for example by the combination shown in FIG. 8B. This second combination shows an original vector set 811 of the original subtest 517 and an original vector set 812 of the original subtest 527 (both of which are taken from the FIG. 6 example(s)) which combine to create a new combination vector set 820 of the combination subtest 537. As in the example of FIG. 8A, the vector sets 811 and 812, here are used and transposed into the included subtest vector labels 811a and 812a within the final combination subtest 537. As in the FIG. 6 example described above, various combinations of subtests and corresponding vector sets may be made in any order as desired for a particular ultimate combination subtest.

Figure 8B:
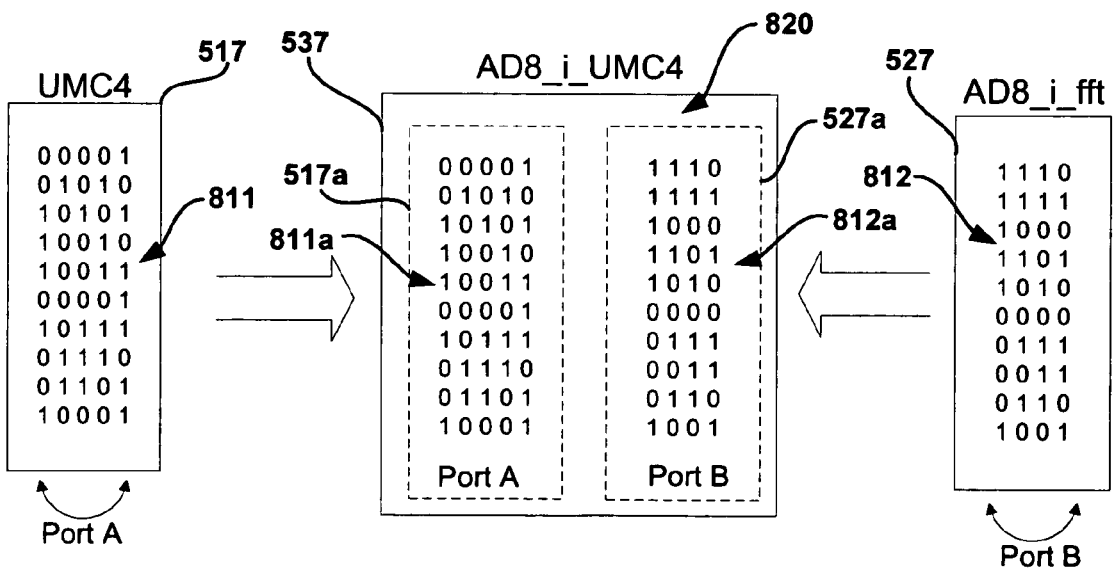

The electronic stimuli and/or response, also known as vectors, which are determined to be used in parallel will be combined in multi-port vector definitions. This is shown in FIGS. 8A and 8B by the retention of the dashed line, port labeled groupings of the respective vector sets 801a, 802a, 811a and 812a within the respective combination subtests 531 and 537. Respective vector sets 801a and 811a are designated for port A, and respective vector sets 802a and 812a are designated for port B. If many vector sets are used on the original test, these will be brought to the new multi-port vector set in the same order. In some embodiments of ATE (e.g., for the Agilent 93000™ automated test equipment available from the assignee of the present invention, Agilent Technologies, Inc., Palo Alto, Calif. USA) the specifications and vector sequences (electrical stimuli and responses) may be defined based on the individual tests in the test sequence.

For digital subtests, the vectors brought from the original subtests will be joined into one or more a multiport burst, i.e., the combination or matrix of one or more vector labels for one or more ports, where the ports' vector labels are joined. For mixed analog tests, the individual analog subtests maybe combined with functional subtests, or other mixed analog subtests with independent analog instrumentation. Each individual subtest in the test flow, for the 93000 a test suite (i.e., a test suite is substantially the same as a subtest as this term is used herein), will be modified to test multiple ports. The test suites from each device will be joined into a single test suite. If this is done simply in the order of the original subtest, the parallel execution of vectors may not improve the efficiency. For example, a very long memory subtest, if combined with a quick digital subtest, will be less efficient than joining it with a long subtest. For this reason, the tool hereof may assess the time of executions (see Table 1, supra), and make suggestions for the appropriate joining of subtests. User control may be desired over this process, as some subtests may not be taken out of sequence. However, either to assist in or improve the computer tool abilities to appropriately analyze and perform the steps of the process, a test flow directive could be added to define subtests, i.e., test suites that require certain ordering in the original test flow.

Then, ultimately, these vector patterns as defined to ports, may then be collected into an array within a final combination vector set, e.g., vector set 810 within an ultimate combination subtest 531, where it can be seen that there remains a demarcation between the vector set portions, e.g., portions 801a and 802a, identified relative to the two ports A and B, so that those vector set portions 801a and 802a may now be made to run substantially simultaneously in parallel, or concurrently, and thus provide for faster overall completion of the subtest(s), i.e., shorter test time(s). This final collection definition in a combination vector set 810 may also include what is known as creating a port vector label.

Figure 9:
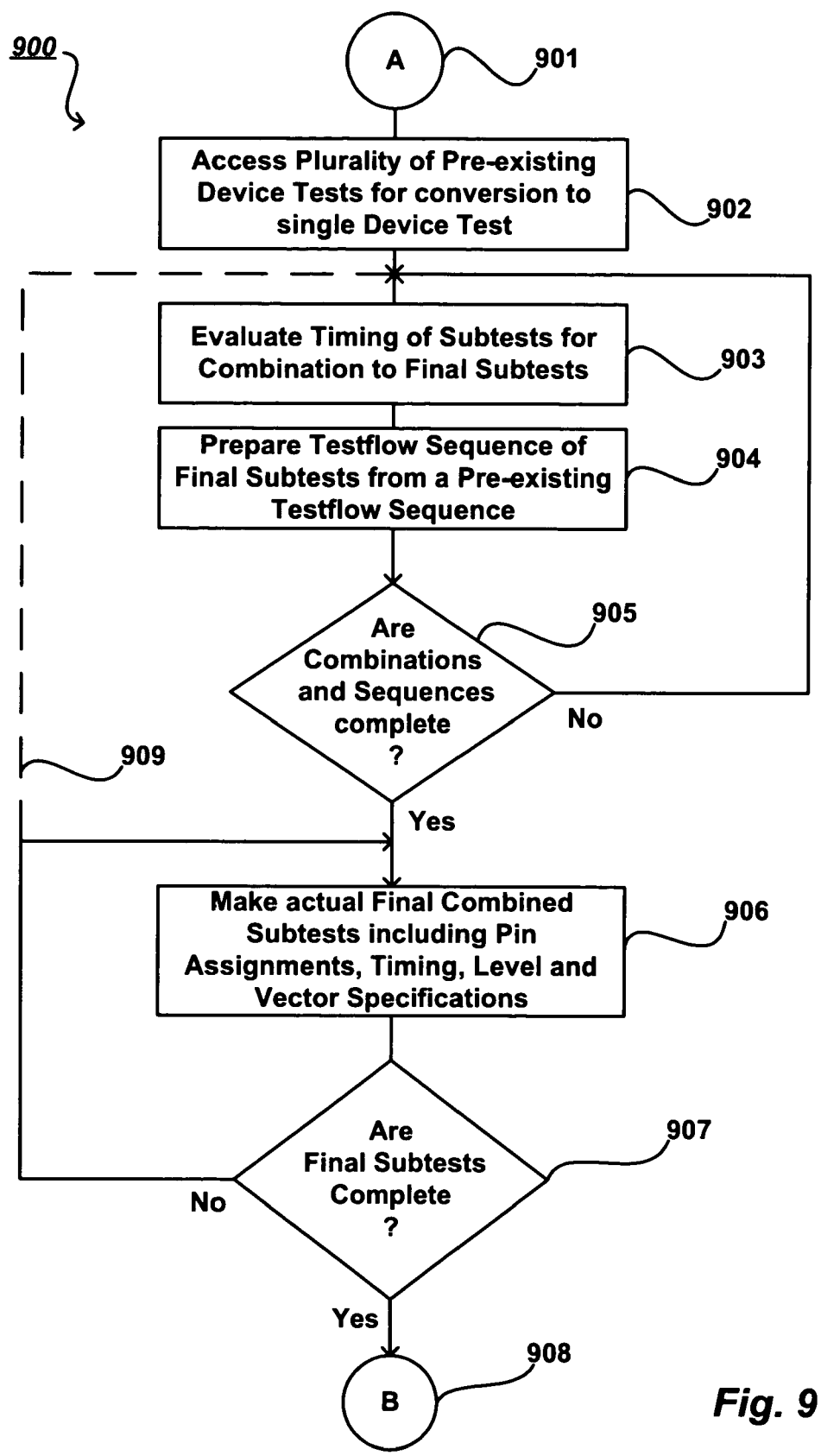
FIG. 9 is a flow chart depicting various steps of a method according to an exemplary embodiment of the present invention.

In FIG. 9, a summary process 900 according to an exemplary embodiment is shown. More particularly, the summary process 900 shows a starting point arbitrarily marked A 901 with a corresponding ending point B 908. And, disposed therebetween several steps are shown. For example, a first step 902 may be the actual accessing of the priorly existing device tests from and for the pre-existing devices being combined herein. A next couple of steps are the initial timing evaluation 903 and testflow sequencing 904. These steps are described above, particularly in regard to the timing evaluation, see Table 1, and the testflow sequencing was described relative to FIG. 6. An optional iteration element 905 is next shown suggesting that the initial steps 903 and 904 may be run through one or more times (by computer and/or human operator) in order to determine good combination matchups and sequences for the overall end device testflow. Note, even though these are described as initial steps, they may alternatively and/or also be performed later in the process. An example of this is shown by the dashed line 909 which returns execution of the process to these otherwise initial steps even at the end of the process, if for example, it may be later determined that certain combinations and/or sequences may not be desirable for whatever reason. In any event, the other sort of sub-process also shown in FIG. 9 involves the actual subtest combination step(s) 906 with a similar sort of iterative element 907 which enables iteration for each individual final combined subtest created hereby and/or for review at any point in the detailed subtest combination process. Note, the step or steps for actually combining subtests may include new or reviewed pin assignments, timing, voltage level, vector planning (e.g., multi-port bursting) and/or other specifications (see FIG. 7 and associated descriptions). The start point A 901 need not be the overall test development starting point as there may be other steps also performed herebefore, and similarly, the endpoint B 908 need not necessarily be an overall endpoint, but rather a connection to any other suitable point in the test development process, and/or connection to the actual testing of the device(s).

Note, as a further part of the last two steps 906 and 907 of FIG. 9 may also be the actual testmethod generation, i.e., the actual computer programming to create the computer programs which will effect the stimuli generation and results analysis according to the specifications of each subtest. More particularly, in some embodiments, the last step of the overall process may be the creation of the final test execution environment, if this has not already been completed by or as a part of the completion of the previously described steps. In many cases, the combined subtest may have a testmethod already established in the ATE architecture (in most cases in the Agilent 93000™ ATE architecture). Even if not absolutely necessary, in the case of some default port subtests (testing all pins with the same setup), testmethod libraries will be selected. This will make it possible for the user to add port based testflow variables to help manage the flow, and characterize the test data.

A number of standard test functions will have existing libraries of testmethods. A standard testmethod may be assigned to the combination subtest. Then the user may customize the testmethod to match the test strategy. Here are some examples:

a) When all parallel subtests are digital functional subtests (i.e., when there are no analog subtests to be run), then, the testmethod may execute one or more digital multi-port bursts, and may then identify and log individual port failures.

b) When there is an analog functional subtest combined with a digital functional subtest, then the testmethod may then use an appropriate start command to start all sequencers. Digital sequence will execute along with analog execution. Standard calculations and results are performed based upon the original analog and digital subtests.

c) When the original subtest has a testmethod, the contents of the testmethod may be copied directly into a digital functional subtestmethod, creating a customized testmethod.

The new testmethods from any of these or any other process may then be compiled. The user can then make modifications immediately, or in the debug phase.

In a primary embodiment then, a tool and/or method/process and/or system is made available wherein a first operation is provided for accessing/evaluating the relative times and/or timing of pre-existing subtests to determine how to organize combinations thereof for the resultant overall test. Then, the tool/method/system may provide for the actual combinations thereof, including the definitions of vectors, levels (voltage levels), and signal/waveform timing. Then, the resultant combined subtests have testmethods defined therefore, by new creation or by use of pre-existing testmethods from pre-existing libraries thereof. Pin/port definitions may be separate from this tool/method/system, or may be incorporated as a part thereof. In either case, the pin/port assignments may be performed before the timing analysis, after the timing analysis, before, during or after the subtest combinations, and/or before, during or after the testmethod establishment. A potentially desirable consequence is a feature which allows or provides for creating tests which test in parallel whenever possible, and/or may also take advantage of providing desirable, if not the best test times possible for the two (or more) pre-existent cores/devices of the newly combined MCM/IC/device.

As described above, the present invention is adapted to facilitate automated test equipment functionality for testing integrated circuits. In this regard, some embodiments of the present invention may be construed as providing test systems for testing integrated circuits, and/or test set-up systems or testflow set-up tools therefor, with such systems being implemented in hardware, software, firmware, or a combination thereof. In a preferred embodiment, however, the test system and/or test set-up system or tool is implemented as a software package, which can be adaptable to run on different platforms and operating systems as shall be described further herein. In particular, a preferred embodiment of the test system and/or test set-up system, which comprises an ordered listing of executable instructions for implementing logical functions, can be embodied in a computer program and/or any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device.

The computer program and/or computer readable medium can be, for example, but is not limited to, an electronic, magnetic, optical, electromagnetic, infrared, semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The figures (e.g., FIG. 1) illustrate a typical computer or processor-based system 22 which may facilitate control functionality of the test system 20 of the present invention. As shown in FIG. 1, a computer system 22 generally comprises a processor and a memory with an operating system. Herein, the memory may be any combination of volatile and nonvolatile memory elements, such as random access memory or read only memory. The processor accepts instructions and data from memory over a local interface, such as a bus(es). The system also includes an input device(s) and an output device(s). Examples of input devices may include, but are not limited to, a serial port, a scanner, a local access network connection, keyboard, mouse or stylus, or the like. Examples of output devices may include, but are not limited to, a video display, a Universal Serial Bus, or a printer port. Generally, this system may run any of a number of different platforms and operating systems, including, but not limited to, HP-UX™, LINUX™, UNIX™, SUN SOLARIS™ or Microsoft Windows™ operating systems, inter alia. The test system 20 of the present invention may in some embodiments reside in the memory and be executed by the processor.

The flowcharts of FIGS. 5, 6 and 9 show the functionality and operation of alternative implementations of the test system 20 depicted in FIGS. 1-4. In this regard, each block of the flowchart may represent a module segment or portion of code which comprises one or more executable instructions for implementing the specified logical function or functions. It should also be noted that the implementations of the functions noted in the various blocks are intended here to represent the sequential order of the testflow. The test nodes may in these instances be moved so that they may effectively occur out of the order depicted in FIGS. 5 and 6.

In FIG. 1, there is shown a user interface screen 23 which may be or provide access to the tool for programming the test signal generator (i.e., generator of the testflow) of and/or for use with the controller 22. The user interface screen 23 may be generated in high level software using a variety of graphical user interface techniques for entering and displaying data on personal computers and workstations. The capabilities of this invention could be invoked from a menu item or the like during multi-port test development. An option such as "Evaluate Timing of Pre-Existing Tests" could be present in the menu structure, or as a button on a dialog, and the search and evaluation would be performed when the button or menu is selected. Software links might be provided to correctly activate editing capabilities for the Multi-Port programming. The signal generator of the controller 22 is highly adaptable and able to generate a wide variety of complex signals including digitally modulated signals as well as traditional function generator signals including, e.g., sine and square waves. The signal generator may typically be interfaced to a personal computer or workstation, allowing for computer control according to selected parameters. Programming the controller and thereby also the signal generator may be done using a menu hierarchy containing a set of user interface screens that allows the user to control signal parameters in a logical and intuitive manner. A user interface screen 23 may then be used to select menu items from the menu structure or hierarchy that allows for programming the parameters of the test. Dialog buttons with or without pop-up windows may also be used. The various parameters may be entered numerically, using pull down menus, or any of variety of data entry techniques. The various dependencies among the parameters may be handled in the user interface to simplify programming. Alternatively, a set of software library functions may be provided to access the parameters of the controller 22 in an automated test system where limited or perhaps even no user/developer programming may be needed. The test program tool and resultant program(s) may be stored in memory on a computer, stored on disk, or any other computer readable medium. They may be part of a single piece of executable code, or they may be separate programs, or routines. Furthermore, they may be executed on the same computer, or they may be run on different pieces of hardware. The hardware implementing the test system shown in FIG. 1 may be a general purpose computing device coupled to the measurement hardware and executing executable code or it may include custom hardware, such as an application specific integrated circuit that integrates one or more of the functions shown.

After the testflow has been developed and established (debugged), then the overall test process can proceed. First, the IC, SOC or MCM under test will be connected to the ATE (if not done so previously, i.e., during test set-up), and the IC/SOC/MCM may be provided by the ATE with appropriate signals to facilitate testing, such as analog parameter testing, among others. Such signals may include, but are not limited to: one or more power signals; one or more clock signals; one or more reset signals; one or more critical signals, and; one or more test control signals, among others. Then, test data is received, such as by the ATE, with the data being received in any suitable manner, e.g., intermittently throughout the testing cycle, or after testing has been completed. The test parameters may then be evaluated to determine whether the integrated circuit is functioning as desired. If it is determined that the integrated circuit is not functioning as desired, the test results may be verified, such as by repeating at least some of the aforementioned process steps, and if the determination once again is made that the integrated circuit is not functioning as desired, the process may proceed to rejection of the integrated circuit. If, however, it is determined that the integrated circuit is functioning as desired, the process may terminate with a positive result. So provided, embodiments of the testing system 20 of the present invention may be or at least may provide part of an efficient and effective testing system which may improve some of the inherent strengths of conventional ATE, e.g., reduced costs, while providing potentially improved testflows, e.g., reduced testing set-up times.

Additionally, some embodiments of the present invention may be construed as providing computer readable media incorporating a computer program. In some embodiments, the computer readable medium includes a computer program for facilitating testing of and/or the setting-up of tests for an IC, SOC or MCM and incorporates computer code and/or logic configured to enable ATE to provide at least one test signal to the IC/SOC/MCM so that a response signal from the IC/SOC/MCM can be received by the ATE to measure at least one parameter communicated via a first pin or pad of the IC/SOC/MCM. Logic configured to enable the ATE to receive and/or evaluate the response signal and/or other data from the IC/SOC/MCM corresponding to the at least one parameter may also be provided.

Embodiments of the present invention may also be construed as providing methods for testing and/or setting up a test for an IC, SOC or MCM. In some embodiments, the IC/SOC/MCM includes a first pin or pad configured as a signal interface for components external to the IC/SOC/MCM, and adapted to communicate test signals relative to at least one parameter of the IC/SOC/MCM. A resulting method for testing may include the steps of: electrically interconnecting the IC/SOC/MCM with the ATE; providing at least one stimulus from the ATE to the IC/SOC/MCM so that the test signals can provide for measuring at least one parameter of the IC/SOC/MCM; and the ATE receiving information corresponding to the at least one parameter presented by the IC/SOC/MCM.

The IC and/or SOC and/or MCM includes at least a first pin or pad disposed to electrically communicate with at least a portion of the ATE, with the first pin or pad being configured as a signal interface for components external to the IC/SOC/MCM. These may thus form systems for measuring a parameter of or communicated through a pin or pad of an IC/SOC/MCM. Preferably, such systems include automated test equipment (ATE) configured to electrically interconnect with the IC/SOC/MCM and to provide at least one signal to the IC and/or SOC and/or MCM. The IC and/or SOC and/or MCM is adapted to electrically communicate with the ATE so that, in response to receiving a test signal from the ATE, a response is then communicated back to the ATE which then measures at least one parameter of or communicated through the first pin. An ATE test protocol which is adapted to measure at least one parameter of or communicated through the first pin is also provided.

As utilized herein, the term IC hereafter is intended to include and refer to an SOC and/or an MCM as well, and the reverse is also intended, vice versa, i.e., the terms SOC and/or MCM may also be used to refer to each other and/or to and/or include an IC. Note, SOCs and MCMs may be considered special kinds of ICs wherein SOCs are devices which may contain an assortment of one or more circuit features such as intellectual property (IP) blocks including, for example, logic cores, memories, embedded processors, and/or a range of mixed-signal and RF cores to support voice, video, audio and/or data communications. Similarly, MCMs are integrated devices which include a one or more previously separate integrated circuit devices incorporated onto a common substrate. Thus, SOCs and/or MCMs may represent a sort of IC integration, where stand-alone IC chipsets may be merged into a few or even into a single SOC and/or MCM.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A non-transitory computer readable medium having an electrically, magnetically or optically stored computer program, the computer program having instructions that, when executed by a processor of a computer system, provide a test development tool, the computer program comprising:

test development program code for accessing first and second pre-established test programs, each of said first and second pre-established test programs having been previously established for programming automated test equipment to test respective first and second pre-existing integrated circuit devices, and said first and second pre-established test programs each having respective first and second sets of subtest code portions;

test development program code for evaluating the first and second sets of subtest code portions and determining whether any respective subtest code portions of said first and second sets of subtest code portions have features allowing for combination in a new test program, said test development program code for the evaluating and determining steps providing at least one output result thereof; and test development program code for defining a new test program for programming automated test equipment, the new test program including at least one new subtest code portion for concurrently testing first and second pre-existing integrated circuit devices using the at least one output result of the evaluating and determining steps.

2. A non-transitory computer readable medium according to claim 1, in which the at least one new subtest code portion for concurrently testing provides for faster overall device test execution.

3. A non-transitory computer readable medium according to claim 1 which further includes:

test development program code for prompting a user to participate in the evaluating and determining steps of the subtest code portions of the first and second pre-established test programs.

4. A non-transitory computer readable medium according to claim 1 wherein said features allowing for combination comprise respective subtest code portions from each of said first and second pre-established test programs which are substantially operatively compatible.

5. A non-transitory computer readable medium according to claim 4 wherein said subtest code portions having features allowing for combination are defined in said defining step as a single set of subtest code portions to be performed via a common port in a multi-port testing environment.

6. A non-transitory computer readable medium according to claim 5 wherein said features allowing for combination are selected from the group consisting of clocks and common pins.

7. A non-transitory computer readable medium according to claim 1 wherein said features allowing for combination comprise respective subtest code portions from each of said first and second pre-established test programs which are mutually exclusive, yet provide for concurrent operation via discrete first and second ports.

8. A non-transitory computer readable medium according to claim 7 wherein the respective subtest code portions from each of said first and second pre-established test programs are evaluated for time of operation.

9. A non-transitory computer readable medium according to claim 8 which further includes:
   test development program code for prompting a user to participate in the evaluation of the timing of the subtest code portions of the first and second pre-established test programs.

10. A non-transitory computer readable medium according to claim 8 wherein the respective subtest code portions from each of said first and second pre-established test programs are matched with each other based upon the similarity of their respective times of operation.

11. A non-transitory computer readable medium according to claim 10 wherein the respective subtest code portions from each of said first and second pre-established test programs are matched in a manner selected from the group consisting of:
   matching respective subtest code portions from each of said first and second pre-established test programs wherein the respective subtest code portions are matched one to one having similar respective times of operation; and,
   matching respective subtest code portions from each of said first and second pre-established test programs wherein a subtest code portion from the first pre-established test program is matched with a plurality of subtest code portions from the second pre-established test program such that the total times of operation of the plurality of subtest code portions is substantially similar to the subtest code portion from the first pre-established test program.

12. A non-transitory computer readable medium according to claim 1 wherein the respective subtest code portions from each of said first and second pre-established test programs are evaluated for new subtest code portion sequencing.

13. A non-transitory computer readable medium according to claim 12 wherein the respective subtest code portions from each of said first and second pre-established test programs are matched with each other to create respective new subtest code portions and are placed into a new test flow as a result of the subtest sequencing evaluation.

14. A non-transitory computer readable medium according to claim 12 wherein the respective subtest code portions from each of said first and second pre-established test programs are matched with each other to create respective new subtest code portions and are placed into a new test flow as a result of the subtest sequencing evaluation and based upon one of the testflows from one of the first and second pre-established test programs.

15. A non-transitory computer readable medium according to claim 12 which further includes:
   test development program code for prompting a user to participate in the sequencing of the new subtest code portions.

16. A non-transitory computer readable medium according to claim 1 which further includes:
   test development program code for creating the new combined subtest code portions from the combination of one or more of the subtest code portions from respectively each of said first and second pre-established test programs, said test development program code including subcode selected from the group consisting of:
   pin assignment subcode;
   subtest timing subcode;
   voltage level subcode; and,
   stimulus sequence subcode.

17. A non-transitory computer readable medium according to claim 16 which further includes:
   test development program code for prompting a user to participate in the creating of the new subtest code portions.

18. A non-transitory computer readable medium having an electrically, magnetically or optically stored computer program, the computer program having instructions that, when executed by a processor of a computer system, provide a test development tool, the computer program comprising:
   test development program code for evaluating relative timings of first and second sets of subtest code portions of first and second pre-established test programs and determining an organization for a combination of respective subtest code portions of said first and second sets of subtest code portions, said test development program code for the evaluating and determining steps providing at least one output result thereof, each of said first and second pre-established test programs having been previously established for programming automated test equipment to test respective first and second pre-existing integrated circuit devices;
   test development program code for combining subtest code portions, including combining the separate setups of vectors, timings and levels from the respective first and second sets of subtest code portions for the subtest code portions being combined and defining a new combined overall test program for programming automated test equipment, the new combined overall test program including at least one new combined subtest code portion for concurrently testing first and second pre-existing integrated circuit devices using the at least one output result of the evaluating and determining steps; and
   test development program code for providing at least one test method to run the at least one new combined subtest code portion of the new combined overall test program for a new combination device including the first and second pre-existing integrated circuit devices.

19. A non-transitory computer readable medium according to claim 18 further comprising test development program code for defining port assignments for the pins of the new combination device.

20. A non-transitory computer readable medium according to claim 19 in which the test development program code for defining port assignments is operative in at least one of the times selected from the group consisting of: before an evaluation of the relative timings of first and second sets of subtest code portions, after an evaluation of the relative timings of first and second sets of subtest code portions, after the combining of subtest code portions, and after the providing of at least one test method to run the at least one new combined subtest code portion of the new combined overall test program.

21. A system comprising:
- means for accessing a plurality of pre-established test programs, said plurality of pre-established test programs each having subtest code portions and each having been previously established for respective pre-existing integrated circuit devices;
- means for evaluating the test code portions of each of said plurality of pre-established test programs and for determining whether any subtest code portions of each of the respective pre-established test programs are operatively compatible, said means for evaluating and determining providing an output result of the evaluation and determination;
- means for defining a new test program including at least one new subtest code portion using the output result of the evaluation and determination.

22. A system according to claim 21 which further includes automated test equipment including test development hardware, firmware and software.

23. A computer implemented method executed by a processor of a computer system, the processor executing instructions of an electrically, magnetically or optically stored computer program, the method comprising:
- the processor accessing first and second pre-established test programs in a multi-port concurrent test environment, each of said first and second pre-established test programs having been previously established for respective first and second pre-existing integrated circuit devices, and said first and second pre-established test programs each having respective first and second sets of subtest code portions;
- the processor evaluating the first and second sets of subtest code portions and determining whether any respective subtest code portions of said first and second sets of subtest code portions have features allowing for combination into a new subtest code portion in a new test program, said evaluating and determining steps providing at least one output result thereof; and
- the processor defining a new test program including a new subtest code portion for concurrently testing first and second pre-existing integrated circuit devices using the at least one output result of the evaluating and determining steps.

24. Apparatus comprising:
- a non-transitory computer readable medium having an electrically, magnetically or optically stored computer program, the computer program having instructions that, when executed by a processor of a computer system, generate at least a portion of an integrated circuit test in a concurrent multi-port automated test environment; said computer program comprising:
  - program code to access first and second pre-established test programs for programming automated test equipment, and to access respective first and second subtest code portions of the first and second pre-established test programs;
  - program code to evaluate whether any of the respective first and second subtest code portions of the respective first and second pre-established test programs may be combined to create a new subtest code portion in a new test program, said program code to evaluate providing at least one output result thereof; and
  - program code to define a new subtest code portion of a new test program for programming automated test equipment, using the at least one output result of the program code to evaluate.

* * * * *

UNITED STATES PATENT AND TRADEMARK OFFICE
CERTIFICATE OF CORRECTION

PATENT NO. : 7,823,128 B2
APPLICATION NO. : 10/828628
DATED : October 26, 2010
INVENTOR(S) : Laura Marie Bundy et al.

It is certified that error appears in the above-identified patent and that said Letters Patent is hereby corrected as shown below:

Column 5, line 15, "110a and 1100b" should read --1100a and 1100b--.

Column 5, line 17, "1100a and 110b" should read --1100a and 1100b--.

Column 5, line 22, "1100a and 100b" should read --1100a and 1100b--.

Column 5, line 47, "1b" should read --18b--.

Column 9, line 12, "1100a and/or 100b" should read --1100a and/or 1100b--.

Column 9, line 19, "1100a, 100b" should read --1100a, 1100b--.

Signed and Sealed this
First Day of February, 2011

David J. Kappos
*Director of the United States Patent and Trademark Office*